United States Patent
Hanisch et al.

(10) Patent No.: US 12,412,941 B2
(45) Date of Patent: *Sep. 9, 2025

(54) METHOD FOR RECYCLING LITHIUM BATTERIES

(71) Applicant: DUESENFELD GMBH, Wendeburg (DE)

(72) Inventors: Christian Hanisch, Braunschweig (DE); Tobias Elwert, Clausthal-Zellerfeld (DE); Lisa Brückner, Clausthal-Zellerfeld (DE)

(73) Assignee: Duesenfeld GmbH, Wendeburg (DE)

( * ) Notice: Subject to any disclaimer, the term of this patent is extended or adjusted under 35 U.S.C. 154(b) by 876 days.

This patent is subject to a terminal disclaimer.

(21) Appl. No.: 17/628,275

(22) PCT Filed: Jul. 26, 2019

(86) PCT No.: PCT/EP2019/070286
§ 371 (c)(1),
(2) Date: Jan. 19, 2022

(87) PCT Pub. No.: WO2021/018372
PCT Pub. Date: Feb. 4, 2021

(65) Prior Publication Data
US 2022/0320619 A1    Oct. 6, 2022

(51) Int. Cl.
*H01M 10/54* (2006.01)
*C22B 3/00* (2006.01)
(Continued)

(52) U.S. Cl.
CPC ............. *H01M 10/54* (2013.01); *C22B 7/007* (2013.01); *C22B 15/0071* (2013.01);
(Continued)

(58) Field of Classification Search
CPC ................................ H01M 6/52; H01M 10/54
See application file for complete search history.

(56) References Cited

U.S. PATENT DOCUMENTS 5,723,097 A * 3/1998 Barnett ..................... C01F 7/56
423/115
7,192,564 B2 * 3/2007 Cardarelli ............... H01M 6/52
75/693
(Continued)

FOREIGN PATENT DOCUMENTS

CN    101519726    *  9/2009
CN    101519726 A    9/2009
(Continued)

OTHER PUBLICATIONS

Li, J. et al., "Environmentally-friendly oxygen-free roasting/wet magnetic separation technology for in situ recycling cobalt, lithium carbonate and graphite from spent LiCoO2/graphite lithium batteries", Journal of Hazardous Materials, Dec. 26, 2015.
(Continued)

*Primary Examiner* — Matthew W Van Oudenaren
(74) *Attorney, Agent, or Firm* — WCF IP

(57) ABSTRACT

A method for recycling lithium batteries containing the steps: (a) digesting comminuted material (10), which contains comminuted components of electrodes of lithium batteries, using concentrated sulphuric acid (12) at a digestion temperature ($T_A$) of at least 100° C., in particular at least 140° C., so that waste gas (14) and a digestion material (16) are produced, (b) discharging the waste gas (14) and (c) wet chemical extraction of at least one metallic component of the digestion material (16).

21 Claims, 12 Drawing Sheets

(51) Int. Cl.
  *C22B 7/00* (2006.01)
  *C22B 15/00* (2006.01)
  *C22B 26/12* (2006.01)
  *C22B 47/00* (2006.01)
  *H01M 10/0525* (2010.01)

(52) U.S. Cl.
  CPC ........ *C22B 23/043* (2013.01); *C22B 23/0484* (2013.01); *C22B 26/12* (2013.01); *C22B 47/0063* (2013.01); *C22B 47/0081* (2013.01); *H01M 10/0525* (2013.01)

(56) References Cited

U.S. PATENT DOCUMENTS

| | | | |
|---|---|---|---|
| 12,018,350 B2* | 6/2024 | Hanisch | .................... C22B 1/06 |
| 2004/0028585 A1* | 2/2004 | Cardarelli | ............. H01M 10/54 |
| | | | 423/66 |
| 2007/0196725 A1 | 8/2007 | Tedjar et al. | |
| 2017/0077564 A1 | 3/2017 | Wang et al. | |
| 2018/0087127 A1 | 3/2018 | Adachi et al. | |
| 2019/0024212 A1 | 1/2019 | Lien | |
| 2021/0032721 A1 | 2/2021 | Hanisch et al. | |
| 2024/0218481 A1* | 7/2024 | Hanisch | .............. C22B 23/0453 |

FOREIGN PATENT DOCUMENTS

| | | |
|---|---|---|
| CN | 103943911 A | 7/2014 |
| CN | 106086427 A | 11/2016 |
| CN | 106505270 A | 3/2017 |
| CN | 106755976 A | 5/2017 |
| CN | 107117661 A | 9/2017 |
| CN | 107267759 A | 10/2017 |
| CN | 107352524 A | 11/2017 |
| CN | 109616713 A | 4/2019 |
| CN | 109775731 A | 5/2019 |
| CN | 111655875 A | 9/2020 |
| CN | 115621596 A | 1/2023 |
| DE | 3622105 A1 | 1/1988 |
| DE | 102015207843 A1 | 11/2016 |
| EP | 0077331 B1 | 8/1985 |
| EP | 3202928 A1 | 8/2017 |
| JP | 2000507308 A | 6/2000 |
| JP | 2003157913 A | 5/2003 |
| JP | 2007323868 A | 12/2007 |
| JP | 2012074247 A | 4/2012 |
| JP | 5929664 B2 | 6/2016 |
| JP | 2016191134 A | 11/2016 |
| JP | 7161272 B2 | 10/2022 |
| KR | 1020060101683 A | 3/2005 |
| KR | 1020150002147 A | 1/2015 |
| WO | 2005101564 A1 | 10/2005 |
| WO | 2011082444 A1 | 7/2011 |
| WO | 2019149698 A1 | 8/2019 |
| WO | 2019183333 A1 | 9/2019 |

OTHER PUBLICATIONS

Meshram et al.; "Extraction of lithium from primary and secondary sources by pre-treatment, leaching and separation: A comprehensive review"; Hydrometallurgy, vol. 150, Dec. 1, 2014, pp. 192-208.

Nayl et al.; "Acid leaching of mixed spent Li-ion batteries"; Arabian Journal of Chemistry, 2017, vol. 10, pp. S3632-S3639.

Xiaowu et al: "Leaching of Valuable Metals from Calcined Spent Lithium-ion Batteries", The Chinese Journal of Process Engineering, vol. 11, No. 2, Apr. 2011.

* cited by examiner

METHOD FOR RECYCLING LITHIUM BATTERIES

The invention relates to a method for recycling lithium batteries. According to a second aspect, the invention relates to a recycling installation for processing lithium batteries.

Lithium batteries are batteries in which the electrical energy is stored by way of an electrochemical reaction that is based on lithium. Lithium batteries are used for a broad scope of purposes. The recycling of lithium batteries is still problematic. It is not yet possible to recycle the graphite contained in electrodes to such a quality that it can be reused for the production of lithium batteries. The recovery of lithium also raises problems. Furthermore, the recovery of cobalt, nickel and manganese, which may be present in lithium batteries, is generally only possible to a certain quality, such that the use thereof in new lithium batteries renders it economically impossible. When considered in its entirety, the material recycling efficiency of known recycling methods in terms of the battery cell is lower then 50% by weight.

US 2004/0028 585 A1 describes a method for recovering vanadium from lithium-metal-polymer batteries. According to one variation, this involves mixing the comminuted material with 30 percent, diluted sulphuric acid. The vanadium is then obtained in the form of vanadium pentoxide from the resulting aqueous solution. Such a method is thus only practical if the vanadium content in the comminuted material is sufficiently high. However, this is not the case in commonly used lithium ions batteries, for example. Moreover, other metallic components, such as cobalt, nickel and manganese, can only be extracted with considerable difficulty. For numerous reasons, including safety reasons, it is not advisable to use concentrated sulphuric acid.

US 2017/0077564 A1 describes a method for recycling lithium ion batteries in which the comminuted material is leached with diluted sulphuric acid and an aqueous hydrogen peroxide solution. The disadvantage of such a method is that it is very complex to achieve the highest recovery rates.

The article entitled "Acid leaching of mixed spent Li-ion batteries" by Nayl et al, Arabian Journal of Chemistry, 2017, 10, S3632-S3639 also describes a leaching method for lithium batteries, in which diluted sulphuric acid and hydrogen peroxide are used. It has been found that the degree of leaching initially increases with an increasing concentration of sulphuric acid and then declines from 3 M. The highest examined concentration is 4 M.

The invention aims to improve the recovery of lithium batteries.

The invention solves the problem by way of a method for recycling lithium batteries containing the steps (a) digesting comminuted material, which contains comminuted components of electrodes of lithium batteries, using sulphuric acid, especially concentrated sulphuric acid, so that waste gas and a digestion material are produced, (b) discharging the waste gas and (c) the wet chemical extraction of at least one metallic component of the digestion material, especially of at least one metallic component (preferably two, three, four or more metallic components) from the list containing cobalt, lithium, manganese, nickel and titanium.

Digestion preferably occurs at a digestion temperature of at least 100° C., preferably at least 120° C., especially preferably at least 140° C. However, it is also possible that the digestion temperature is below 100° C.

According to a second aspect, the invention solves the problem by way of a recycling installation for processing lithium batteries, especially used lithium batteries, with (a) a reactor for digesting comminuted material, which contains comminuted components of electrodes of the lithium batteries, with concentrated sulphuric acid at a digestion temperature of at least 100° C., (b) a sulphuric acid supply device for adding sulphuric acid to the comminuted material and (c) a discharge device, which is arranged to discharge waste gas out of the reactor. In particular, the discharge device is designed in such a way that it is hydrogen fluoride-proof. In other words, hydrogen fluoride cannot escape into the surrounding environment.

The advantage of the invention is that any fluoride that may be present in the comminuted material can be completely removed during the digestion of the comminuted material using sulphuric acid, said sulphuric acid preferably being concentrated. Fluorine compounds can form hydrogen fluoride, which is extremely problematic from an occupational safety perspective. Hydrogen fluoride is also highly corrosive. By digesting the comminuted material with sulphuric acid, the fluoride is removed from the comminuted material, so that the subsequent steps in the process can be executed in consideration of fewer safety precautions and with a lower degree of material wear. Some separation methods (such as membrane separation methods, bipolar membrane electrodialysis) cannot be conducted in fluids with high fluoride levels; however, such a preparation would enable this. Furthermore, impurities caused by fluorine substances cannot occur, so that the other components of the comminuted material can generally be recovered with a high degree of purity.

It is also advantageous that the battery graphite can often be recovered with such a high degree of purity that it can be used for the production of new electrodes.

It is also practical that the method can generally be conducted in such a way that the lithium is recovered to a sufficiently high degree of purity, so that it is suitable for the production of new lithium batteries. Insofar as they are present in the comminuted material, cobalt and/or manganese can also be recovered to a high degree of purity, thereby rendering them suitable for reuse in a battery.

It is especially advantageous that a recycling efficiency of over 50% by weight in terms of a battery cell can be achieved in most cases.

It should be noted that the specified advantages may occur, but it is not essential that they do.

Known methods focus on the recovery of cobalt and nickel, as these represent the highest material value in used lithium batteries. It is accepted that other components in used lithium batteries, such as the graphite and/or the lithium, cannot be recovered. The recovery of fluoride is also not a priority of known methods, as its resale value is relatively low.

It is particularly beneficial that the method according to the invention can, in most cases, be designed in such a way that, in comparison to pyrometallurgical methods, it requires less energy. In particular, according to preferred embodiment, the method does not comprise a pyrometallurgical step.

From DE 10 2015 207 843 A1, it is known to be advantageous to dry the batteries at a low temperature following comminution, so as to prevent the formation of fluoro-organic substances. During this drying, the organic carbonates that are present in the electrolytes are removed. Therefore, the fluorine compounds remain in the comminuted material. According to a preferred embodiment, the digestion is executed on comminuted material that contains at least one fluorine compound.

Within the scope of the present description, a method for recycling lithium batteries should be understood especially to mean a method during which metallic components of the lithium batteries are recovered. In this sense, the method according to the invention is also a method for extracting metallic components from lithium batteries. The metallic components are, for example, lithium and/or transition metals, especially metals from the sixth, seventh and eighth groups. The transition metals are preferably manganese and/or cobalt and/or nickel. It is also practical if copper and/or titanium are recovered.

Within the scope of the present description, a lithium battery should be to understood particularly to mean a rechargeable battery whose electrochemical reaction involves lithium and/or lithium ions and/or a lithium compound. A battery contains at least galvanic elements.

Preferably, the lithium batteries are at least partially lithium ion batteries. It is especially preferable if the comminuted material contains at least 40% by weight, especially 60% by weight, of lithium ion batteries. Lithium ion batteries contain fluid electrolytes that contain fluoride: said electrolytes render the recycling of the lithium batteries considerably more difficult.

The fluoride content in the comminuted material is preferably lower than 7% by weight, in particular lower than 5% by weight.

The fluoride content in the comminuted material is preferably at least 0.5% by weight, in particular at least 1% by weight.

A recycling installation should be understood especially to mean a device by means of which 1, 2, 3 or more metallic components of lithium batteries is/are separated from other components of the lithium battery, such that further processing is possible.

When temperatures are specified in the following description, they always refer to the average temperature in the corresponding object. For example, digestion at a digestion temperature of at least 100° C. should be understood especially to mean that the temperature of the comminuted material that is mixed with the sulphuric acid is on average 100° C. It is irrelevant that locally higher or lower temperatures may exist. If no explicit reference is made to a temperature, the corresponding step in the method is preferably conducted at room temperature and ambient pressure of the surrounding atmosphere.

Any use of the indefinite article should be understood to mean that at least one of the respective objects is available. For example, a recycling installation can mean precisely one comminution unit, but also two, three or more comminution units.

Digestion should be understood particularly to mean that no diluted sulphuric acid is used. In particular, at at least one point during the reaction, the concentration of the sulphuric acid is above 90%, especially 95%, especially preferably 98%.

Specifically, digestion is conducted in such a way that fluoride is removed in the form of gaseous fluorine compounds. Specifically, digestion is conducted in such a way that fluoride components in the comminuted material migrate into the waste gas in the form of hydrogen fluoride. In other words, there is so little water present in the mix of comminuted material and sulphuric acid that a concentration of water-soluble fluoride is less than 100 milligrams per kilogram of digested material, especially less than 10 milligrams per kilogram of digested material.

The aspect that the comminuted material is digested with concentrated sulphuric acid should be understood especially to mean that, in an interval during the execution of the method, the concentration of sulphuric acid is so high that the concentration of water-soluble fluoride per kilogram of digested material specified above is reached. Preferably, the concentration of the sulphuric acid during the execution of the method is at least 95%, preferably at least 98%. Unlike in cases when non-concentrated sulphuric acid is used, the use of concentrated sulphuric acid means that the digested material contains barely any fluoride.

Specifically, digestion is not leaching, as leaching is always conducted with an aqueous fluid.

In particular, the digestion material is solid. Unlike methods which do not use concentrated sulphuric acid, the reaction products, i.e. especially the metallic sulphates, cannot dissolve in water and remain as solid matter.

Comminuted material is to be understood particularly to mean a material that results from the comminution of lithium batteries or at least a component of lithium batteries, especially electrodes, and where applicable from a post-processing procedure, for example drying. Comminution may thus be followed by several separation steps to separate comminuted metallic foils, plastic foils or cell envelope components and module components. It is practical if the comminuted material contains at most 10% by weight, preferably at most 5% by weight, of plastics and/or metallic impurities. The comminuted material may contain powdery components of electrodes from lithium batteries. In a more general form, non-comminuted material, especially electrode material, can be used instead of the comminuted material. However, it is beneficial for this electrode material to be comminuted.

Specifically, the comminuted material can be a material that has not been subjected to any pyrometallurgical treatment, particularly calcination and combustion. However, it would also be possible and included in the invention for the comminuted material to not have been subjected to any pyrometallurgical treatment.

The discharge of the waste gas is to be understood especially to mean that the waste gas is at least largely directed away from the point of digestion. It is possible that the waste gas is suctioned away. The waste gas generally contains a fluorine compound, particularly hydrogen fluoride. It is possible, but not necessary, that the hydrogen fluoride is removed from the waste gas, especially via precipitation, preferably with a calcium compound. It is also possible that the waste gas is added to a chemical process.

Wet chemical extraction should be understood particularly to mean that a substance that is liquid at 1013 hPa and room temperature or is so in the state in which it is added, is added to the digestion material or a substance which comes from the digestion material, which causes the separation of at least one substance that contains a metal or is a metal itself.

The sulphuric acid is preferably at least 90%, especially preferably at least 95%.

However, it is possible that a sulphuric acid with a low concentration is added to the comminuted material. In this case, the digestion temperature is preferably at least the temperature that is required to evaporate enough water from the sulphuric acid to ensure that it has a concentration of at least 90%, especially at least 95%. References to percentages generally refer to percent by weight.

The digestion of the comminuted material preferably comprises the step of mixing the comminuted material with the sulphuric acid. Mixing may comprise a spraying with sulphuric acid and/or forced action mixing, for example an extrusion, kneading or agitation.

The digestion temperature is preferably lower than the boiling point of the sulphuric acid to prevent an evaporation of the sulphuric acid. Preferably, the digestion temperature is lower than a binder decomposition temperature of a binder by means of which the active material is bound to its carrier. Alternatively, the digestion temperature can be higher than the binder decomposition temperature. This prevents the binder from contaminating the graphite. However, it should be noted that it is possible, but not necessary, for the comminuted material to contain an appropriate binder. Temperatures between 150° C. and 250° C. are especially favourable.

The digestion can be conducted—like the other steps in the method—under shielding gas, such as nitrogen or argon, to prevent the oxidation of graphite. It is possible, but not necessary, for other steps in the method to also be conducted under shielding gas.

The digestion can—like the other steps in the method—be conducted discontinuously or continuously.

According to a preferred embodiment, the digestion material contains a maximum of 15% water, especially less than 10% water, preferably less than 5%. If very little or no water is present, fluoride is removed in the form of hydrogen fluoride, so that very few or no fluoride compounds remain.

Digestion is preferably conducted until a hydrogen fluoride concentration in the waste gas is below 0.83 mg per cubic meter. Preferably, the hydrogen fluoride concentration is below the traceability threshold. The traceability threshold refers in particular to an infrared-spectrometric measurement. This ensures that significant quantities of hydrogen fluoride cannot be given off in the subsequent steps in the process.

Alternatively or additionally, digestion is conducted until a fluoride concentration $c_F$ of water-soluble fluoride in the digestion material is lower than 100 milligrams per kilogram of digestion material, preferably lower than 10 mg/kg and especially preferably below the traceability threshold.

According to a preferred embodiment, digestion of the comminuted material comprises the steps (a) mixing concentrated sulphuric acid and comminuted material so that a mixture is created, (b) detecting a mixture temperature of the mixture and (c) regulating (i) a dosage mass flow of the sulphuric acid and/or (ii) an addition mass flow of the comminuted material, so that the mixture temperature remains within a predetermined mixture temperature range. An upper range limit of the mixture temperature is preferably at most 330° C., particularly at most 300° C., particularly at most 270° C. The lower range limit of the mixture temperature is less relevant as the reaction is generally exothermic. For example, the lower range limit is 0° C.

Preferred is a (a) dosing of concentrated sulphuric acid to the comminuted material with a dosage mass flow so that the mixture is created, (b) detection of the mixture temperature of the mixture and (c) regulation of the dosage mass flow so that the mixture temperature remains within the predetermined mixture temperature range.

For example, the comminuted material is filled in a reactor and the sulphuric acid then added in doses. Dosing should be understood to mean that the sulphuric acid is added to the comminuted material in such a way that ensures that the addition of the sulphuric acid can be reduced to such an extent, in particular stopped, if the mixture temperature is outside of the predetermined mixture temperature range. It is practical, but not necessary, for dosing to be done in such a way that a mass flow is known and/or influenced in a controlled manner.

Preferably, the sulphuric acid is added to the comminuted material at least stoichiometrically, but preferably over-stoichiometrically. This should be understood particularly to mean that enough sulphuric acid is added to render it possible to extract all non-precious metals and copper in the comminuted material and, according to a preferred embodiment, to extract them in a subsequent step in the method. Specifically, enough sulphuric acid is added to ensure that all non-precious metals and copper in the comminuted material dissolve by at least 99% by weight. It should be noted that, even in the case of an over-stoichiometric addition of sulphuric acid, due to the finite nature of the reaction speed and the adjusting chemical balance, metal residues may remain that did not react with the sulphuric acid.

Preferably, the concentrated sulphuric acid is used at a weight ratio to the weight of the comminuted material of at most 40 to 1, especially at most 20 to 1, preferably at most 10 to 1. In other words, a maximum of 40 kilograms of concentrated sulphuric acid is added per kilogram of comminuted material.

For instance, it is beneficial if at least 1.8 grams $H_2SO_4$ per gram of cathode material is added, especially 1.8 grams $H_2SO_4$ per gram of electrode active material. In particular, the cathode material is $LiMO_2$, wherein M stands for a transition metal or aluminium. The cathode is the electrode that is positively charged during discharging.

The method preferably comprises the step of separating hydrogen fluoride from the waste gas, especially the precipitation of hydrogen fluoride from the waste gas. This is achieved, for instance, by means of a calcium compound, resulting in the formation of calcium fluoride.

The method preferably comprises leaching of the digestion material. Leaching is preferably done with an aqueous fluid, especially water. A weight ratio of digestion material to aqueous fluid is preferably 1:2 to 1:20. Leaching is carried out for at least 1 minute and preferably for a maximum of 10 hours.

During leaching, the pH value is preferably between −0.7 and 4. Leaching is preferably conducted at room temperature; however, this is not essential.

The method preferably includes a separation of graphite, thereby obtaining a raw fluid. This is done after leaching. The separation is preferably a filtering. However, it is also possible that the graphite is centrifuged or separated in another manner. Digestion with sulphuric acid generally results in the concentration of metal, especially metal ions, in the graphite being so low that the graphite is suitable for use as electrode graphite for producing new lithium batteries or other batteries.

It is possible that the method comprises the step of purifying the separated graphite, which can be achieved with water or a diluted mineral acid, for example. Silicon, among other things, is preferably removed in this way.

The purification is preferably so intensive that at most 10 mg/kg of metal ions are left in the wash water. It has been proven that, in known methods, the crystalline structure of graphite can be so severely damaged that it cannot be used as electrode graphite. Due to the fact that, according to a preferred embodiment of the method, no wet chemical or thermal oxidation occurs prior to the separation of the graphite, the crystalline structure of the graphite is damaged so little that it can often be reused in batteries.

The purification of the graphite preferably includes heating the graphite to a decomposition temperature $T_Z$ of the binder of at least 250° C. and/or at most 700° C., in particular at most 430° C. At such a temperature, any binder residues, which are often composed of polyvinylidene fluoride, are decomposed. Higher temperatures could damage the graphite. Heating may be conducted under a vacuum, in particular at a maximum pressure of 300 hPa, but this is not necessary.

Heating may be conducted in an oxidizing atmosphere, for example in air or oxygen, wherein air or oxygen are preferably added.

Alternatively, heating may be conducted in an inert atmosphere, for example in an atmosphere composed of nitrogen and/or argon.

Alternatively, heating may be conducted in a reducing atmosphere. For example, the atmosphere then contains hydrogen.

The purification of the graphite may also include a classification of the graphite, so that
- at least one fine fraction and one coarse fraction are obtained. Classification is preferably conducted in such a way that a binder content of binder in the fine fraction is at least twice as large as in the coarse fraction. Classification may be a separation, for example.

Alternatively or additionally, purifying the graphite may include floating the graphite or binder, particularly in an aqueous flotation fluid.

As another alternative or in addition, purification may comprise dissolving a binder out of the graphite using a solvent. Water, N-Methyl-pyrrolidone or a mix of both are suitable solvents, for example. Purification is preferably carried out until a binder content is smaller than a predetermined maximum binder content. The maximum binder content is preferably at most 2% by weight, especially at most 1% by weight. In general, a maximum binder content greater than 0.1 per mille is tolerable.

Dissolving out preferably occurs at a solvent temperature at least 20° C., especially at least 40° C., especially preferably at least 60° C.

It is beneficial if purification comprises the steps of regenerating the solvent by (i) reducing the solubility of the binder, particularly by reducing the temperature of the solvent and filtering the binder or (ii) evaporating the solvent and recondensing the solvent. Alternatively, the solvent can continue to be replaced until the binder content is smaller than the maximum binder content.

As another alternative or in addition, purification of the graphite comprises a rinsing and/or washing with acid, in particular a mineral acid, preferably sulphuric acid. Purification is preferably carried out until a concentration of metallic impurities is at most 10 000 ppm. Graphite purified in this way can replace newly produced graphite in many fields of application.

Preferably, the method comprises the step of separating copper from the raw fluid, resulting in de-copperized raw fluid. It is possible, but not necessary, that the separation of the copper is the wet chemical process that occurs immediately after leaching. In particular, it is also possible that other metals are separated before the separation of copper. Specifically, this refers to a selective copper separation. A temperature during the separation of the copper is preferably between 0° C. and 100° C. Separation is preferably carried out over 1 minute to 720 minutes.

The separation may be a cementation. In the case of cementation, an electrochemical reaction of the copper ions takes place, causing the formation of elementary copper. For example, cementation is carried out with a ferrous substrate.

Alternatively, the separation comprises a precipitation. For instance, the copper can be precipitated as copper sulphide. To this end, the raw fluid is fed into a precipitating substance, such as a sulphurous substance. This may refer to sodium hydrogen sulphide. In this case, copper sulphide precipitates, especially CuS. It is favourable if the precipitating substance is added over-stoichiometrically, so that a concentration of copper ions in the de-copperized raw fluid is preferably lower then 10 mg per liter, especially preferably lower than 1 mg per liter.

The method preferably includes the step of oxidizing the de-copperized solution. This is preferably achieved by adding an oxidation agent. For example, hydrogen peroxide can be used as an oxidation agent.

Oxidation is preferably conducted in such a way that iron ions are oxidized. It is beneficial if this is followed by a step of precipitating iron. Specifically, $Fe^{2+}$ ions in the de-copperized raw fluid are oxidized to form $Fe^{3+}$ ions. This may be achieved with an oxidation agent, such as an oxygen compound. The oxygen compound may be hydrogen peroxide or ozone, for example.

The precipitation of iron preferably occurs as hydroxide. It is especially favourable if aluminium is precipitated, preferably in the form of a hydroxide. It is also beneficial if existing titanium is precipitated, preferably in the form of titanium oxide. The precipitation of iron and/or aluminium results in a pure fluid.

The precipitation of iron and/or aluminium and/or titanium preferably occurs due to the addition of NaOH, $Na_2CO_3$, KOH, MgO or ammonium hydroxide.

It should be noted that the term pure fluid should only indicate that metals which are seen as an impurity, such as iron and, where applicable, copper, aluminium and titanium, have been removed. In particular, the term pure fluid is not intended to give any indication of the concentration of other substances.

The feature that an oxygen compound is used for oxidation should be understood to mean that oxygen changes its oxidation number during the redox reaction. Alternatively, a compound can be used as an oxidation agent which, for example, contains oxygen but does not change its oxidation number during the redox reaction.

Oxidation is preferably conducted until the electrochemical potential is between 0.8 and 1.4 Volt in relation to the normal hydrogen electrode. The redaction $Fe^{2+} \rightleftharpoons Fe^{3+}+e^-$ occurs in this voltage range.

Preferably, the pH value during oxidation is at most 8.7. During precipitation, the pH value is preferably at least 4.3, especially preferably 4.8. In particular, the pH value during precipitation is at most 8.7, preferably at most 7.8. As a result, iron and/or aluminium and/or titanium are largely precipitated.

According to a preferred embodiment, the method includes the step of an ion exchange. An ion exchanger is used for this purpose. The ion exchange is preferably conducted in such a way that metallic impurities are removed. Metallic impurities are zinc and/or copper and/or aluminium and/or iron. It is possible that all four elements, three of the elements, two of the elements or only one of the elements are removed. For the ion exchange, an ion exchanger is used, for example, that contains a chelating agent with aminophosphonic acid groups as functional groups.

It is beneficial if the ion exchange is carried out after the iron and/or aluminium has been precipitated. In this way, the quantity of iron and/or aluminium that has to be removed by means of ion exchange remains small.

According to a preferred embodiment, the method includes the step of removing solvent residues of the electrolyte, particularly by filtration and/or absorption. This is preferably done before the ion exchange and/or after or at the same time as the precipitation of the iron and/or aluminium. It is especially preferable if removal occurs in the de-copperized raw fluid and/or the pure fluid. Absorption is preferably conducted using activated carbon.

It is possible, but not necessary, that the removal of solvent residues of the electrolyte is done by loosely adding activated carbon and removing it afterwards, especially by filtration.

Preferably, manganese is removed from the pure fluid, in particular through solvent extraction, preferably by means of a manganese complexing agent that is dissolved in a lipophilic fluid, for example. The lipophilic fluid may be, for example, a mineral oil, such as kerosene. The manganese complexing agent can be di-(2-ethylhexyl)phosphoric acid, for example. The pH value for the removal of manganese is preferably between 1 and 9.

It is has been proven advantageous to extract manganese before cobalt. This renders Cyanex 301 (Bis(2,4,4-trimethylpentyl)dithiophosphinic acid) unnecessary for the separation of the transition metals, which reduces the degree of instrument complexity.

The method preferably comprises a solvent extraction of cobalt. It is preferably extracted from the pure fluid or the fluid from which the manganese has been removed. It is especially beneficial to use a cobalt complexing agent for this, such as a complexing agent that is dissolved in a lipophilic fluid. The lipophilic fluid may be, for example, a mineral oil, such as kerosene. One possibility is to use a phosphinic acid, such as Cyanex 272 (bis(2,2,4 trimethylpentyl)phosphinic acid). The pH value for the extraction of cobalt is preferably between 1 and 10.

The method preferably comprises the step of extracting nickel. According to a preferred embodiment, the removal of nickel is a solvent extraction of nickel. This is preferably done using a nickel complexing agent. This can be di-(2-ethylhexyl)phosphoric acid, for example. The pH value is then preferably between 1 and 10. Alternatively, the nickel complexing agent may be neodecanoic acid. In this case, the pH value is preferably between 2 and 10. The complexing agent is preferably dissolved in a lipophilic fluid, such as a mineral oil like kerosene. It is beneficial if solvent extraction is done from the pure liquid from which manganese and cobalt have been removed.

According to an alternative embodiment, the removal of nickel comprises a precipitation of alkaline nickel carbonate. Alkaline nickel carbonate has the general formula x NiCO$_3$·y Ni(OH)$_2$·z H$_2$O. Precipitation preferably occurs at a temperature within a temperature range of 0-100° C., particularly at least 70° C. The pH value upon precipitation is preferably above pH 7, particularly above pH 9.9.

It is has also been proven advantageous to extract cobalt and nickel before manganese. In this case, the manganese can be precipitated and solvent extraction is unnecessary.

According to a preferred alternative embodiment for the extraction of transition metals, cobalt and nickel can be extracted from the pure fluid in a combined extraction process, so that a cobalt and nickel-enriched fluid is obtained.

Cyanex 301 (Bis(2,4,4-trimethylpentyl)dithiophosphinic acid), for instance, is well-suited for the extraction of nickel or cobalt, wherein the Cyanex can be used having been dissolved in kerosene beforehand. A loaded organic phase is formed in the process. Nickel and/or cobalt can be re-extracted from the loaded organic phase, for example using hydrochloric acid or sulphuric acid. Cobalt can be removed from the solution containing cobalt and nickel obtained in this way by means of a cobalt complexing agent. This is achieved, for example, by way of a complexing agent dissolved in a lipophilic fluid. The lipophilic fluid may be, for example, a mineral oil, such as kerosene. One possibility is to use a phosphinic acid, such as Cyanex 272 (bis(2,2,4 trimethylpentyl)phosphinic acid).

Nickel is subsequently crystallized in the form of nickel chloride or nickel sulphate. Cobalt can also be re-extracted from the charged organic phase using hydrochloric acid and/or sulphuric acid, for example, and then crystallized in the form of cobalt chloride or cobalt sulphate.

The removal of nickel and cobalt results in a nickel and cobalt-enriched solution. Manganese can be removed from this solution, in particular via solvent extraction, preferably by means of a manganese complexing agent. This can be di-(2-ethylhexyl)phosphoric acid, for example. The pH value for the removal of manganese is preferably between 1 and 9. This results in a loaded organic phase from which manganese can be re-extracted. Manganese chloride and/or manganese sulphate can then be crystallized from the resulting solution.

Alternatively, manganese, for example in the form of carbonate, can be precipitated out of the nickel and cobalt-enriched solution. To this end, a carbonate, such as sodium carbonate, is preferably added to the fluid containing manganese. The pH value is preferably above 7, in particular above 10.5.

As another alternative or in addition, the manganese is precipitated as manganese hydroxide. To this end, a hydroxide, such as sodium hydroxide, is preferably added to the target fluid containing manganese. The pH value is preferably above 7, in particular above 10.5.

The removal of cobalt, nickel and/or manganese results in a target fluid.

According to a preferred embodiment, lithium is removed from the target fluid. Preferably, lithium is precipitated from the target fluid. This may occur, for instance, by adding a phosphate, such as sodium phosphate, or a carbonate, such as sodium carbonate. The precipitation of lithium preferably occurs at pH 7 to 14.

It is beneficial if the precipitation is preceded by a concentration step, thereby increasing the concentration of lithium. Alternatively, the lithium may be precipitated as lithium phosphate; to this end, sodium phosphate can be added, for example. The concentration may occur, for instance, via reverse osmosis and/or evaporation.

If the pure fluid contains neither cobalt nor nickel nor manganese, lithium is preferably precipitated from the pure fluid. This is the case if, for instance, the comminuted material is produced using only lithium iron phosphate batteries.

Alternatively, the lithium is extracted by means of solvent extraction. To this end, a lithium complexing agent is preferably used, for example Cyanex 936 from Solvay. Following re-extraction with a mineral acid, a concentrated lithium solution is obtained from which the lithium can be precipitated or crystallized.

Preferably, the comminuted material contains powdery electrode material from lithium ion batteries. Comminuted electrode foils, separator foils, other foils, the cell envelope materials and components of the battery module periphery are separated from the comminuted lithium ion batteries, resulting in powdery electrode active material.

The comminuted material is preferably obtained by comminuting batteries and simultaneously and/or subsequently deactivating the resulting raw comminuted material through drying. It is especially beneficial if comminution occurs in an inert gas atmosphere and/or under a vacuum. If comminution occurs under a vacuum, a pressure is preferably at most 300 hPa. Preferably, a temperature is a maximum of 100° C., preferably a maximum of 80° C. This prevents the formation of fluoro-organic substances. The fluoride remains in the comminuted material and is removed via digestion with sulphuric acid, as described above.

According to a preferred embodiment, deactivation is followed by the separation of comminuted metallic current collector foils, separator foils of the cell envelope components and the module components, resulting in the comminuted material.

It is beneficial if the comminuted material is heated following comminution to an electrolyte removal temperature $T_E$ of over 80° C., so that electrolyte in the comminuted material is evaporated. During deactivation, low-boiling electrolyte components are removed. However, it is possible that higher-boiling electrolyte components remain in the comminuted material. These may impede the subsequent steps in the method, so it is advantageous to remove them. The electrolyte removal temperature $T_E$ is preferably at least 100° C., especially at least 150° C., and at most 300° C., especially at most 250° C.

The batteries are preferably pre-discharged and/or obtained by dismantling battery systems or battery modules.

In the case of a recycling installation according to the invention, the reactor is preferably a rotary kiln or a forced action mixer, especially a heated forced action mixer. This ensures a thorough mixing of sulphuric acid with the comminuted material. The reactor features, for instance, a temperature control or regulator, by means of which the temperature of the mixture of comminuted material and sulphuric acid is brought to the digestion temperature and maintained at this temperature. Digestion can occur continuously or discontinuously.

According to a preferred embodiment, the recycling installation has a dosing device for dosing a dosage mass flow $q_m$ of concentrated sulphuric acid to the comminuted material, resulting in a mixture, and (b) a mixture temperature detection device for detecting a mixture temperature $T_M$ of the mixture. The dosing device is preferably configured to regulate the dosage mass flow $q_m$, so that the mixture temperature $T_M$ remains within a predetermined mixture temperature range I. It has been proven that a significant amount of heat accumulates when the sulphuric acid is added. To prevent the mixture temperature $T_M$ of the mixture from increasing too much, the mixture temperature $T_M$ is monitored and the dosage mass flow $q_m$ regulated in such a way that a predetermined mixture temperature target value $T_{M,Soll}$ is not exceeded.

According to a preferred embodiment, the recycling installation comprises a leaching device for leaching the digestion material in an aqueous medium.

The recycling installation preferably has a fluoride separator for separating the hydrogen fluoride. For example, the hydrogen fluoride may be precipitated. However, it is also possible that the hydrogen fluoride is diverted to a reaction with another substance, such as an organic substance.

It is favourable if the recycling installation is designed to be mobile. In other words, it is possible to move the recycling installation without having to dismantle it. The recycling installation is preferably arranged in a 20 foot container or a 40 foot container.

The transportation of comminuted material is often associated with risks, as it contains flammable substances and fluorine compounds. Therefore, there is a risk, possibly an acceptably small risk, that a release of hydrogen fluoride will cause a fire. It is thus practical for the electrolyte, cell components, electrode foils and electrode powder to be separated locally. It is therefore advantageous if the recycling installation comprises a battery processing installation for comminuting lithium batteries, as described in DE 10 2015 207 843 A1. It is then possible, but not necessary, for the reactor, the one sulphuric acid supply device and the discharge device, as well as any other devices specified in the claims, to be designed to be mobile and preferably arranged together in a 20 foot container or a 40 foot container.

The recycling installation preferably comprises a graphite recovery device, which features a graphite separation device, especially a filter, for separating graphite and is arranged behind the reactor in a direction of material flow.

According to a preferred embodiment, the graphite recovery device comprises a wash-out device for washing out adherent leaching solution from the graphite. This wash-out device is preferably designed to wash out the leaching solution with an aqueous fluid.

The recycling installation preferably has a fluoride detector for detecting fluorine compounds, especially hydrogen fluoride. The fluoride detector is preferably a hydrogen fluoride analyzer for measuring a hydrogen fluoride concentration in the waste gas.

According to a preferred embodiment, the recycling installation features a control unit, which is connected to the fluoride detector and designed to automatically control the reactor, such that it maintains the digestion temperature until the fluoride concentration, especially the hydrogen fluoride concentration, in the waste gas falls below a predetermined threshold value.

According to a preferred embodiment, the recycling installation has a precipitation material separator for separating, especially filtering out, precipitated Cu or Cu compounds.

It is favourable if the recycling installation has a transition metal extraction device, especially a solvent extraction device for extracting cobalt, manganese and/or nickel, which is arranged behind the graphite recovery device in the direction of material flow.

The recycling installation preferably also has a Fe/Al/Ti precipitation material separator for separating, especially filtering out, precipitated iron and/or aluminium and/or titanium compounds. The Fe/Al/Ti precipitation material separator is preferably arranged behind the deactivation device, for example the rotary kiln, and, where applicable, in front of a transition metal removal device for removing cobalt, nickel and/or manganese, for example in the form of a solvent extraction device, in the direction of material flow.

According to a preferred embodiment, the recycling installation features an ion exchanger for conducting an ion exchange during which zinc and/or copper and/or iron and/or aluminium is removed. Specifically, the ion exchanger is designed in such a way that cobalt and/or nickel and/or manganese are not removed during ion exchange. The ion exchanger is preferably arranged behind a copper extractor for extracting copper from the raw fluid in the direction of material flow. It is especially preferable if the ion exchanger is arranged behind the Fe/Al/Ti precipitation material separator in the direction of material flow.

The recycling installation preferably has an activated carbon filter for removing organic compounds, especially electrolyte components. The activated carbon filter is preferably arranged behind the Fe/Al/Ti precipitation material separator in the direction of material flow.

Preferably, the maximum temperature to which the comminuted material or digestion material is subjected is 1000°

C., preferably at most 700° C., particularly less than 335° C. The comminuted material has preferably not undergone a decrepitation treatment.

A recycling installation according to the invention preferably features a comminution unit for comminuting the lithium batteries, resulting in shredded material. The recycling installation preferably also features a deactivation device for deactivating the shredded material. It is beneficial if the deactivation device comprises a drying device, which is configured to dry the shredded material until an electrolyte content of the comminuted material is so low that an electrochemical reaction is impossible.

It is possible that the recycling installation features an electrolyte removal device for heating the deactivated comminuted material to an electrolyte removal temperature ($T_E$) of over 80° C., particularly above 120° C. The electrolyte removal device is arranged behind the deactivation device in the direction of material flow.

The recycling installation preferably has a vacuum installation that is connected to the drying device for the purpose of generating a vacuum in the drying device.

It is practical if the vacuum device is designed to generate a vacuum of at least 300 hPa. In other words, the vacuum installation is designed in such a way that a pressure of 300 hPa or less is reached. To ensure a low degree of instrument complexity, the vacuum installation is preferably constructed in such a way that the maximum possible pressure is greater than 0.01 Pa, preferably greater than 1 Pa.

The recycling installation preferably has a cemented carbide separation device for separating cemented carbide from the comminuted material. A cemented carbide separation device should be understood particularly to mean a device for separating fragments of peripheral components of the battery system, the battery cell and/or and the electrical contacts of the lithium battery. For example, the cemented carbide separation device has a magnet separation device and/or a separator, in particular a cross-flow separator and/or a zigzag separator.

Alternatively or additionally, the recycling installation preferably has a light fraction separation device for separating a light fraction that comprises, for example, the separator foil and coating material. The light fraction separation device preferably has a zigzag separator and/or an air separator, wherein it is favourable if the air in the light fraction separation device is conducted within a circuit. This reduces the exposure of the environment to dust. The air separator may be an air jet sieve.

It is favourable if the recycling installation has a separation device, especially a classification device, for separating active material from the carrier, in particular by means of air jet sieving and/or a second comminution stage such that an active material fraction and a carrier fraction are obtained. In particular, the carrier fraction comprises aluminium and copper foil.

It is possible, but not essential, for the recycling installation to have a filling device for filling a transport container with the comminuted material. By means of this transport container, the comminuted material can be transported over longer distances if necessary, for example at least 1 km. The comminuted material can then be directed out of the transport container and into the reactor.

Alternatively, it is possible that the recycling installation does not have a filling device for filling a transport container with the comminuted material. In this case, the comminuted material is preferably transported following comminution to the reactor by means of a continuous or discontinuous conveyor and introduced into the reactor.

In the following, the invention will be explained in more detail by way of the attached figures. They show:

FIG. 1 a flow diagram of a method according to the invention and

FIG. 2 a schematic view of a recycling installation according to the invention,

FIG. 3 a flow diagram for a method according to the invention for processing comminuted material that is free of cobalt, nickel and manganese, FIG. 4 the flow diagram of a method for processing comminuted material that is free of cobalt and nickel but contains manganese, and FIG. 5 a flow diagram of a method according to the invention for comminuted material that is free of manganese and nickel but contains cobalt.

FIG. 6 a flow diagram for the processing of comminuted material that is free of manganese but contains cobalt and nickel.

FIG. 7 a schematic view of a recycling installation according to the invention.

Figure 1:
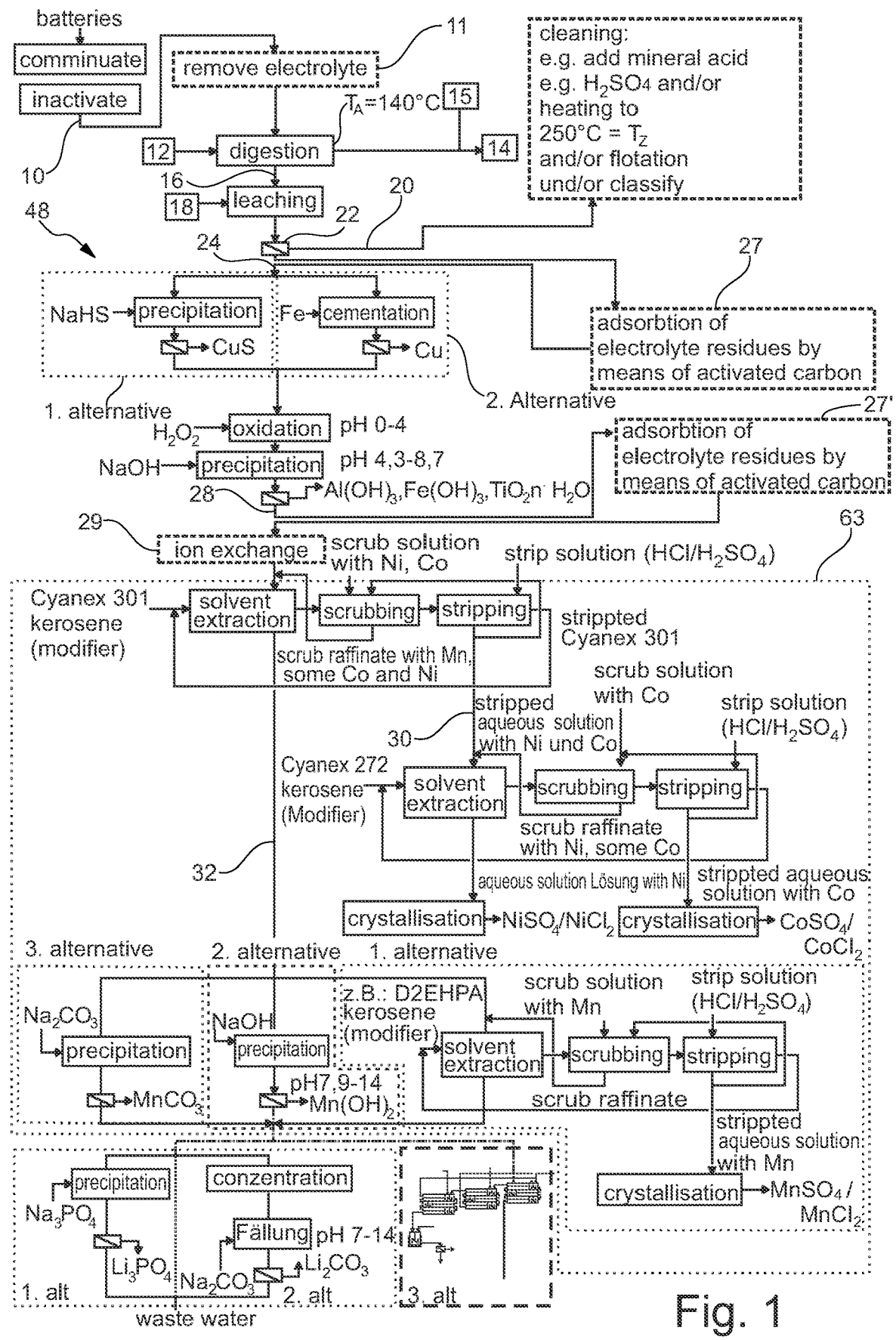

FIG. 1 shows a flow diagram of a method according to the invention. First of all, the comminuted material, for example in the form of comminuted electrode active material, is provided. This may be achieved, for instance, using a method described in DE 10 2015 207 843 A1, which is incorporated with this reference. In particular, it is possible that batteries are initially comminuted, thereby resulting in raw comminuted material. In a subsequent step, the raw comminuted material is deactivated via drying, so that deactivated raw comminuted material is obtained.

The deactivation is preferably a drying. The drying occurs, for example, in an inert gas atmosphere or under a vacuum. It is favourable if a pressure is at most 300 hPa and a temperature during drying is at most 80° C. This results in comminuted material 10 that can no longer react electrochemically to a significant degree, as the proportion of low boilers in the electrolyte is too low.

After deactivation, the method may include the step of removing electrolyte. To this end, a container 11 is filled with the deactivated comminuted material 10 where it is heated to an electrolyte removal temperature $T_E$ of preferably above 100° C., especially above T=150° C. It is possible, but not necessary, that the container 11 is a vacuum container to which a vacuum of, for example, at least 300 hPa can be applied by means of a vacuum pump which is part of the recycling installation. In the container 11, electrolyte is removed from the comminuted material 10 that could not be removed during deactivation.

Deactivation and, where applicable, heating to the electrolyte removal temperature $T_E$ is followed by a separation of the electrode active material from the raw comminuted material according to a preferred embodiment of the method. This preferably comprises a combination of mechanical stress, magnetic separation, non-ferrous metal separation, sieving and density separation. It is practical to use air jet sieving, wherein the use of finer cut-sizes results in a purer sieved material.

The comminuted material 10 is mixed with sulphuric acid 12. The mixing may be, for instance, an agitation using an agitator. However, it is also possible that mixing is a simple addition. In particular, this is possible if the comminuted material 10 is in a reactor, for example in the form of a rotary kiln.

It is also possible that the comminuted material and the sulphuric acid are mixed in a reaction container. The resulting mixed comminuted material is then added to a reactor, especially a rotary kiln.

Figure 2A:
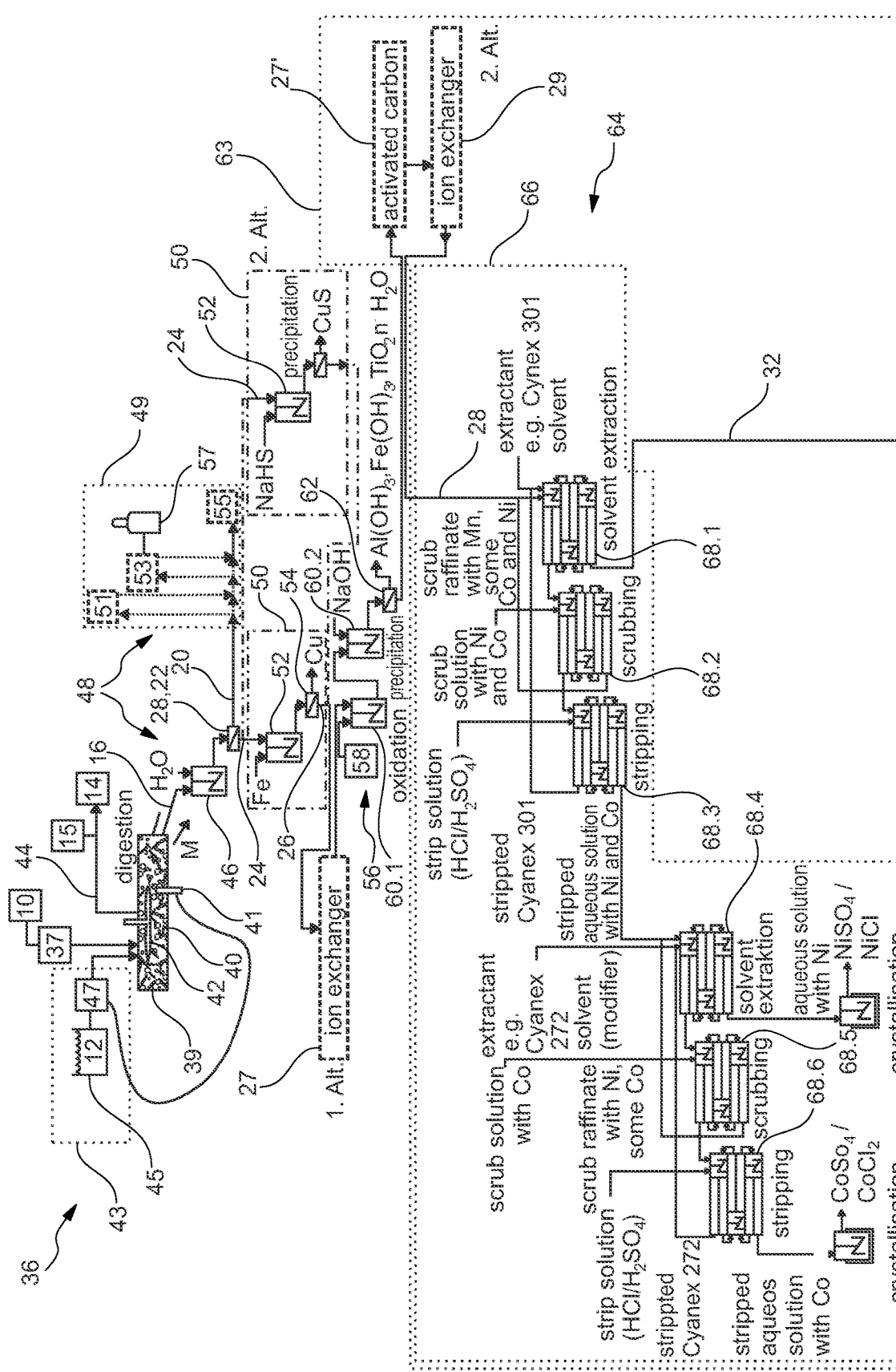
Figure 2B:
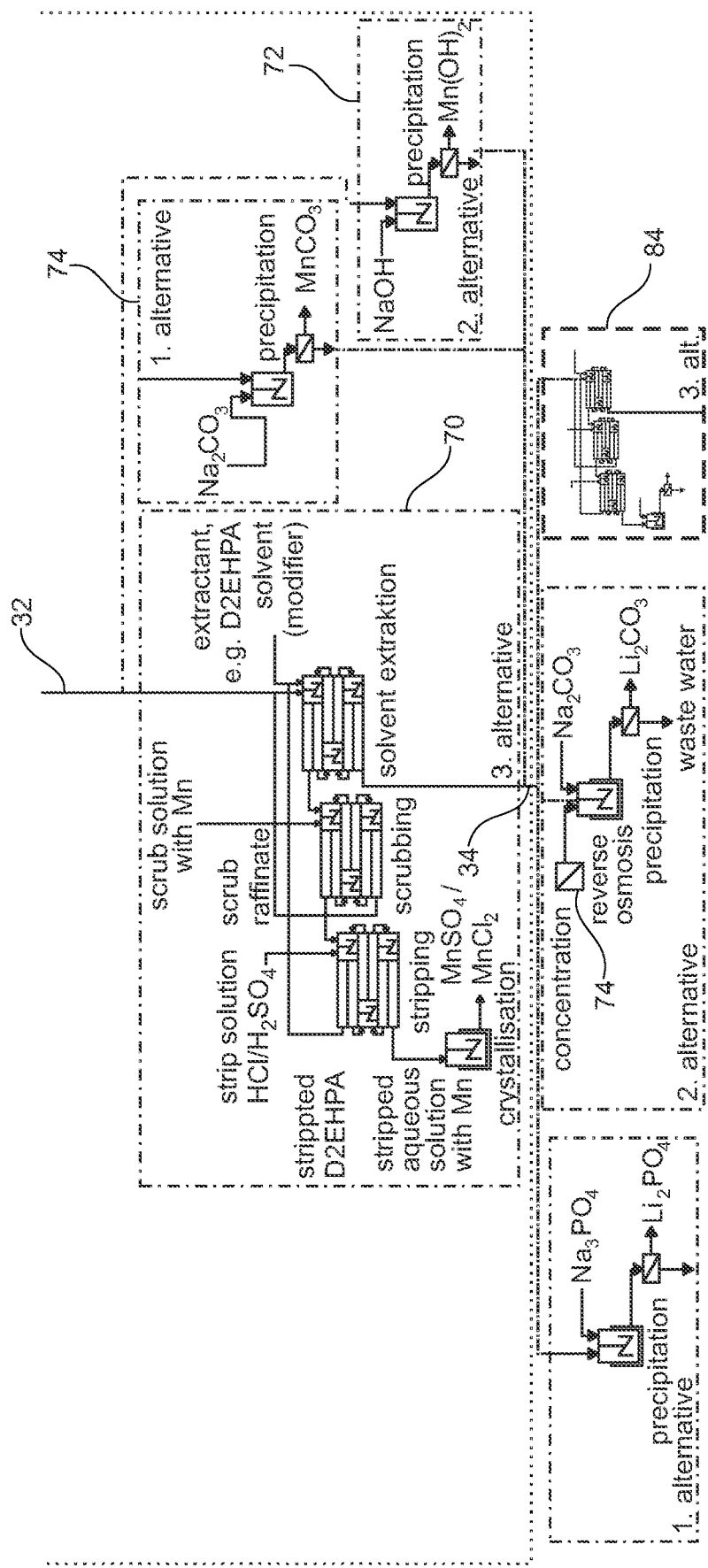

It is beneficial if the sulphuric acid 12 is dosed by means of a sulphuric acid supply device 43 (cf. FIG. 2). The preferred embodiments for this sulphuric acid supply device described in relation to FIG. 2 also apply for the method described in FIG. 1.

The sulphuric acid 12 is preferably at least 95%. The comminuted material 10 and the sulphuric acid 12 are brought up to a digestion temperature $T_A$, for example at least $T_A=140°$ C., especially at least 150° C. Insofar as a pH value can be determined, it is below pH 1.5 for the mixture of comminuted material and sulphuric acid. In general, however, the water content of the mixture is too low to determine the pH value.

The digestion produces waste gas 14, which contains hydrogen fluoride HF in particular. The digestion occurs until a fluorine compound content, particularly a hydrogen fluoride content, in the waste gas 14 has a predetermined threshold of, for instance, 0.83 mg per cubic meter, as determined in a discontinuous comparative test in a container without a continuous addition of material. This is checked using a fluoride detector 15, which continuously measures a fluoride concentration.

If digestion occurs in a charging process, the digestion is conducted until the fluorine compound content, especially a hydrogen fluoride content, is below a predetermined threshold of, for example, 0.83 mg per cubic meter.

Alternatively or additionally, digestion is conducted until a fluoride concentration $c_F$ of water-soluble fluoride in the digestion material is lower than 100 milligrams per kilogram of digestion material, preferably lower than 10 mg/kg and especially preferably below the traceability threshold. In other words, the retention time of the comminuted material 10 and the sulphuric acid 12 is selected in such a way that the digestion material has a fluoride concentration $c_F$ of water-soluble fluoride that does not exceed the specified values.

In addition, digestion material 16 is obtained that can be deemed, to a good approximation, to be fluoride-free. Water 18 is added to the digestion material 16, thereby leaching it. Leaching may occur in the same container in which the digestion of the comminuted material occurred; however, this is not essential. For instance, it is possible that the digestion material is put in a container that preferably already contains water. Leaching occurs at a pH value of –0.7 to 4 and preferably without an active addition or discharge of heat.

Following leaching, graphite 20 is separated using a graphite separation device 22. In the present case, the graphite separation device 22 is a filter with a pore size of at most 15 micrometers, preferably at most 10 micrometers. It is beneficial if the pore size is at least 0.5 micrometers.

The graphite 20 can be purified in a subsequent step in the method. This is achieved, for example, by adding water, an alcohol, an organic solvent or a mineral acid, so that electrode graphite is obtained. Electrode graphite is a graphite that is suitable for the production of electrodes, especially for lithium batteries. The separation of the graphite 20 results in a raw fluid 24.

The purification of the graphite 20 may comprise heating to a decomposition temperature $T_{20}$ of $T_{20}>$ than 250° C., particularly $T_z>350°$ C. Preferably, $T_z<=430°$ C. Due to the heating, binder residues, for example made of polyvinylidene fluoride (PVFD), are decomposed. This preferably occurs in a sealed container.

Alternatively or additionally, purification may comprise a classification. However, classification is optional. The binder residues generally have a smaller diameter than the graphite particles, so that the binder residue content can be reduced by filtering out the smaller components.

Alternatively or additionally, purification may comprise a flotation. Flotation occurs in an aqueous fluid, for example.

If the purification includes the addition of a mineral acid, such as hydrofluoric acid or hydrochloric acid, the silicone content is also reduced, which is advantageous.

Metallic copper Cu is obtained from the raw fluid 24, for instance via cementation. To this end, metallic iron is brought into contact with the raw fluid 24, for example, so that iron ions dissolve and copper precipitates metallically.

Alternatively, the copper is separated in the form of copper sulphide. This is achieved, for instance, via precipitation by adding sodium hydrogensulphide NaHS.

The separation of the copper results in de-copperized raw fluid 26. This has a pH value between 0 and 4, for instance pH 1.

The $Fe^{2+}$ ions in the de-copperized raw fluid 26 are then oxidized to form $Fe^{3+}$ ions. In the present case, this is achieved by adding hydrogen peroxide $H_2O_2$. However, a different oxidation agent can also be used. The pH value of the de-copperized raw fluid is below 4.3 prior to oxidation. This step is preferably conducted without an active heat supply or extraction.

In a subsequent step, iron, aluminium and, where applicable, titanium are precipitated in the form of a hydroxide. To this end, the pH value is increased to a value between 4.3 and 8.7. This is achieved by adding sodium hydroxide and then separating, especially filtering out or centrifuging, the resulting precipitation. In addition to the separated hydroxides, a pure fluid 28 is also obtained.

It is possible, but not necessary, that the pure fluid 28 is purified of organic components by means of an activated carbon filter 27'. In particular, if purification has already been carried out beforehand, especially by means of activated carbon 27, this is unnecessary.

It is possible, but not necessary, that zinc and/or copper and/or iron and/or aluminium are removed by means of ion exchange. This is done with an ion exchanger 29. The stationary phase of the ion exchanger 29 is preferably a chelating agent with aminophosphonic acid groups as functional groups.

Solvent extraction is used to extract nickel and cobalt from the pure fluid 28. In the present case, this is achieved using Cyanex 301, which is dissolved in an organic solvent, generally kerosene.

FIG. 1 shows that two solvent extraction steps are nested inside one another. First, cobalt and nickel are extracted using Cyanex 301, which is dissolved in kerosene. Stripping with acid, especially with hydrochloric acid or sulphuric acid, is used to obtain a solution 30 that contains nickel and cobalt. Following further separation using Cyanex 272, they are crystallized separately.

If a metal, such as manganese, is specifically named, as it is here or generally in the description, this generally refers to the metals in their elementary form and compounds contained in this metal; it generally also includes the metal ions. The statement that manganese, cobalt and nickel are extracted thus also means that manganese, cobalt and nickel ions and any compounds, and especially ions, containing manganese, cobalt and nickel are removed.

The extraction of cobalt and nickel results in a target fluid 32 that contains manganese. The pH value of the target fluid 32 may be between −0.7 and 10.5.

There are (at least) three options for the further processing of the target fluid 32. According to a first option, the manganese in the target fluid 32 that contains manganese is removed by solvent extraction. This may occur, for instance, using D2EHPA dissolved in kerosene.

According to a second and third option, the manganese is removed by precipitation, which may occur, for instance, by adding sodium hydroxide. According to a third option, precipitation may occur by adding sodium carbonate.

The removal of the manganese produces a target fluid 34. The most important component of this fluid is lithium ions. According to a first alternative, the lithium can be precipitated as phosphate. To this end, sodium phosphate, for example, is added to the target fluid 34.

According to a second alternative, lithium is precipitated from the target fluid 34 as carbonate. This is done, for example, using sodium carbonate. A favorable temperature is at most 30 Kelvin below the boiling point of the target fluid 34 and preferably above 50° C. As an option, the lithium carbonate is washed using water at 50-100° C., preferably 80-100° C., and/or ethanol.

It is beneficial if the precipitation is preceded by a concentration step, thereby increasing the concentration of lithium. Alternatively, the lithium may be precipitated as lithium phosphate; to this end, sodium phosphate can be added, for example. Concentration may occur, for instance, via reverse osmosis and/or evaporation.

According to the third alternative, the lithium is extracted by solvent extraction. Details can be found in the description of FIG. 8b. The components of a lithium solvent extraction installation 84 for conducting solvent extraction are therefore only schematically depicted.

FIG. 2 depicts a schematic view of a recycling installation 36 according to the invention for processing lithium batteries, in the present case in the form of comminuted material 10 produced from lithium batteries. Alternatively, it is also possible that electrode material that does not need to be comminuted is processed in the recycling installation. In the present case, the recycling installation 36 features a reactor 40, in which the comminuted material 10 is digested with sulphuric acid 12. The comminuted material 10 and the sulphuric acid 12 are mixed together with a mixer 42. The mixer 42 is an advantage but not essential. The reactor 40 may be a rotary kiln, but this is not necessary. In particular, the reactor 40 may be a container, as in the present case, which may feature a mixer.

The sulphuric acid 12 is added by means of a sulphuric acid supply device 43, which may refer, for instance, to a dosing device, comprising a sulphuric acid container 45 and a controllable valve 47. However, it is also possible that the sulphuric acid 12 is is poured in from a container.

It is possible that the reactor 40 is first filled with the comminuted material 10, for example by means of a conveyor. The sulphuric acid 12 is then dosed by means of the controllable valve 47. A mixture temperature detection device 41 detects whether a mixture temperature $T_M$ of the mixture 39 remains within a predetermined mixture temperature range I. For example, the mixture temperature detection device 41 is a thermometer. However, it is also possible that the mixture temperature detection device 41 comprises a camera and an evaluation unit so that a foam development of the mixture 39 can be detected quantitatively or qualitatively if foam development is a measure of the mixture temperature $T_M$ of the mixture 39.

If the mixture temperature $T_M$ leaves the mixture temperature range, a dosage mass flow $q_m$ of sulphuric acid is reduced by further or completely closing the valve 47. If the mixture temperature $T_M$ moves back into the mixture temperature range I, the valve 47 is opened (further).

Alternatively, the reactor 40 is filled with the sulphuric acid 12 and the comminuted material 10 then added, for example by means of a conveyor 37, such as a belt conveyor or screw conveyor. If the mixture temperature $T_M$ leaves the mixture temperature range, an addition mass flow $q_{10}$ of the comminuted material 10 is reduced, particularly to zero. If the mixture temperature $T_M$ moves back into the mixture temperature range I, the addition mass flow $q_{10}$ is increased.

As another alternative, the sulphuric acid 12 and the comminuted material 10 are added simultaneously. If the mixture temperature $T_M$ leaves the mixture temperature range, an addition mass flow $q_{10}$ of the comminuted material 10 is reduced, either the dosage mass flow $q_m$ or the addition mass flow $q_{10}$ or both are reduced, particularly to zero.

The recycling installation 36 has a discharge device 44 in the form of a waste gas pipe, which can be connected to a vacuum generator so that the waste gas 14 is suctioned out of the reactor 40. Alternatively, it is possible that the excess pressure in the reactor 40 pushes the waste gas 14 through the discharge device 44. The discharge device 44 may feature a washer for washing out hydrogen fluoride. For example, in this washer, the waste gas 14 is brought into contact with a calcium compound, for instance an aqueous solution that contains calcium ions, so that hydrogen fluoride in the waste gas 14 is washed out.

Of course, other methods for removing hydrogen fluoride from the waste gas 14 are conceivable. It is also possible that the waste gas 14 is added to a reactor by means of the discharge device 44, in which the hydrogen fluoride reacts, for example, with an organic substance. The fluoride concentration $c_F$ is identified using a fluoride detector 15.

A leaching device 46 is arranged behind the reactor 40 in the direction of material flow M, wherein the digestion material 16 is leached, for instance with water, in said leaching device.

A graphite recovery device 48 is arranged behind the leaching device 46 in the direction of material flow M, wherein said graphite recovery device only features the graphite separation device 22 in the form of a filter in the present case. An optional wash-out device for washing out adherent leaching solution from the graphite is not depicted. It is also possible to initially fill a transport container with the graphite and to conduct the washing-out of adherent leaching solution following transportation to another location.

The graphite recovery device 48 can comprise a graphite purification installation 49 that features a leaching reactor 51 and/or a furnace 53 and/or a classifier 55.

The leaching reactor 51 is designed to leach the graphite 20 with a mineral acid, especially hydrofluoric acid or hydrochloric acid.

The furnace 53 is designed to heat the graphite 20 to the decomposition temperature $T_z$. The furnace 53 may be connected to a gas feed 57 that supplies an oxidizing gas, especially oxygen or air, when heating is to be done in an oxidizing atmosphere. If heating is to be done in a reducing atmosphere, the gas feed 57 supplies a reducing gas, such as hydrogen. If heating is to be done in an inert atmosphere, the gas feed 57 supplies a shielding gas, such as nitrogen or argon, or alternatively or additionally a vacuum installation is connected to the furnace 57 to apply a vacuum of preferably at least 300 hPa to the furnace.

The classifier 55 is designed to create at least a fine fraction and coarse fraction, wherein the binder content of binder in the fine fraction is greater than in the coarse fraction.

The graphite purification installation 49 can also feature a flotation device for floating the graphite, by means of which binder residue can be separated from the graphite 20. It is possible that the graphite purification installation 49 features one, two, three or four of the named components. The graphite purification installation 49 is also optional.

As described above for the embodiment according to FIG. 1, the recycling installation 36 may comprise the ion exchanger 29. Alternatively or additionally, the recovery installation 36 can feature one or two activated carbon filters 27, 27'.

A copper extractor 50 is arranged behind the graphite recovery device 48 in the direction of material flow. According to a first alternative, the copper extractor comprises a container 52 for cementing the copper following the addition of iron, especially in the form of sheet iron or iron filings, as well as a precipitation material separator 54 for separating selected copper compounds. The precipitation material separator 54 may be a filter, for example. The pore size of the filter is preferably smaller than 50 micrometers and at least 1 micrometer.

According to an alternative embodiment, the precipitation material separator is designed to separate copper sulphide and the container 52 is for the reaction of the raw fluid 24 with NaHS, so that copper sulphide precipitates.

An Fe/Al/Ti separator 56 is arranged behind the copper extractor 50 in the direction of the material flow, wherein an oxidation agent 58 is added to the de-copperized raw fluid 26 in said separator. This may occur in a first container 60.1. The resulting solution is then transferred, for example pumped, into a second container 60.2. In this second container 60.2, a hydroxide is added, in particular an alkaline hydroxide. For instance, sodium hydroxide is added. This results in the precipitation of aluminium, iron and, where applicable, titanium in the form of a hydroxide or a hydrated oxide. The precipitation is removed by means of a particle separator 62 arranged down-stream in the direction of material flow. The particle separator 62 is formed by a filter, for example, which may have a maximum pore size of 15 micrometers.

The resulting pure fluid 28 is added to a transition metal extraction device 63, in the present case a solvent extraction device 64, which features a Co/Ni solvent extraction device 66. This comprises a multitude of reaction containers 8.1, 38.2, . . . , which are connected to one another as shown in FIG. 2. The structure of a solvent extraction device is known from the prior art and will therefore not be explained in further detail. This produces the target fluid 32 containing manganese.

The target fluid 32 is added to a manganese solvent extraction device 70, which generates target fluid 34.

According to an alternative, the target fluid 32 containing manganese is added to a second precipitation reactor 72, in which the manganese is precipitated as manganese hydroxide following the addition of a hydroxide, especially an alkaline hydroxide such as sodium hydroxide.

According to a third alternative, the target fluid 32 containing manganese is added to a precipitation reactor 74. Following the addition of a carbonate, in particular following the addition of sodium carbonate, manganese is precipitated in the form of manganese carbonate or separated.

According to a first alternative, the lithium is precipitated in respective containers as carbonate by adding sodium carbonate or, according to a second alternative, as phosphate by adding sodium phosphate. It is possible that the recycling installation 36 comprises a concentrator 74 for removing water from the target fluid 34 to facilitate precipitation. According to the third alternative, the lithium is extracted by solvent extraction. Details can be found in the description of FIG. 8b.

It is possible, but not necessary, that the recovery installation 36 comprises a graphite purification installation 49. The graphite purification installation 49 may comprise the leaching reactor 51 and/or the furnace 53. As another alternative or in addition, the graphite purification installation 49 may comprise a classifier 55. This applies in general for all embodiments of the invention.

Figure 3:
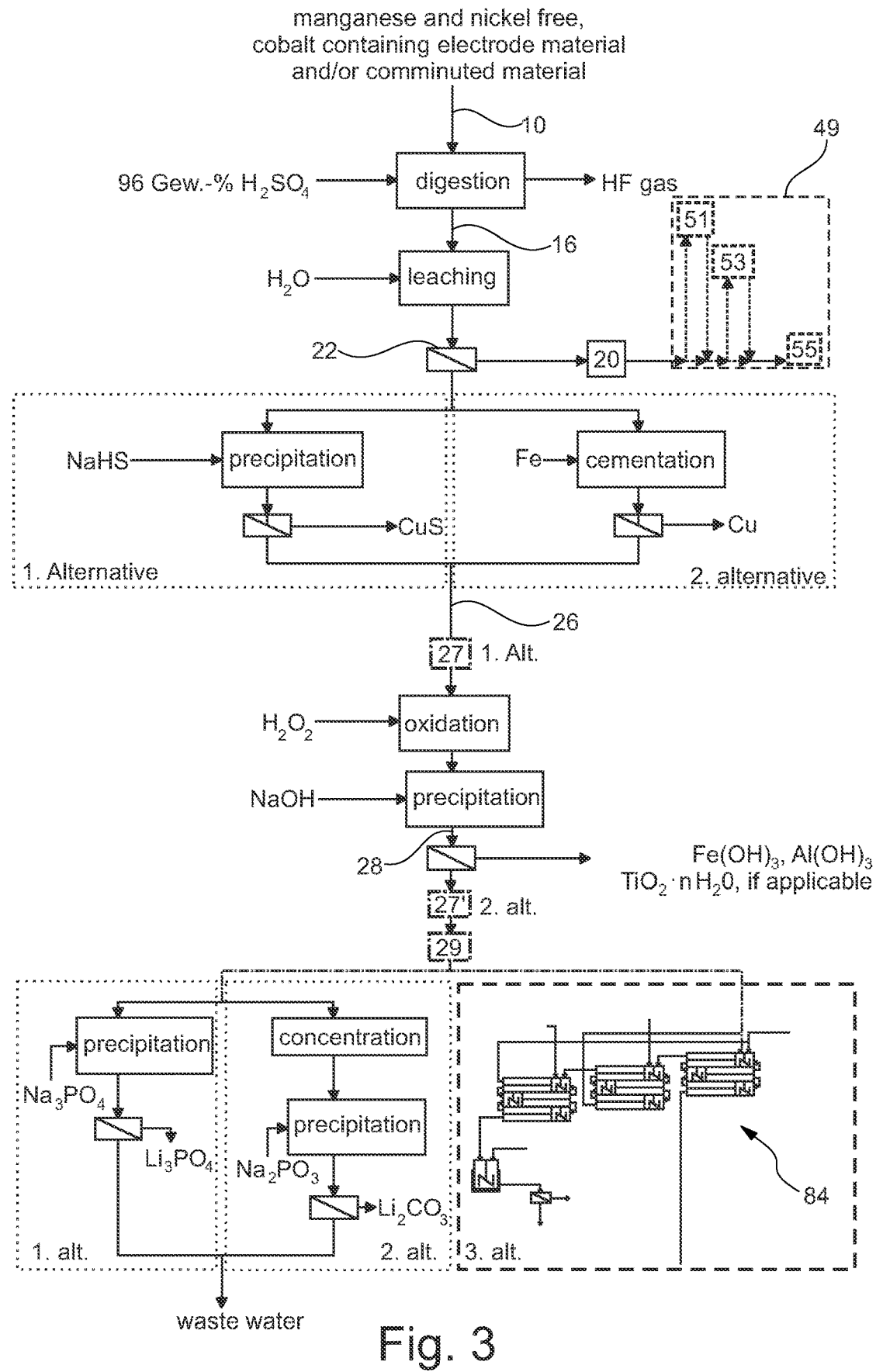

FIG. 3 shows a flow diagram for a method according to the invention for processing comminuted material and/or electrode material that is free of cobalt, nickel and manganese. It should be noted that the method corresponds to the method according to FIG. 1, wherein the steps related to the extraction of cobalt, nickel and manganese have been omitted. The activated carbon filters 27, 27' are optional, as is the ion exchanger 29.

Figure 4:
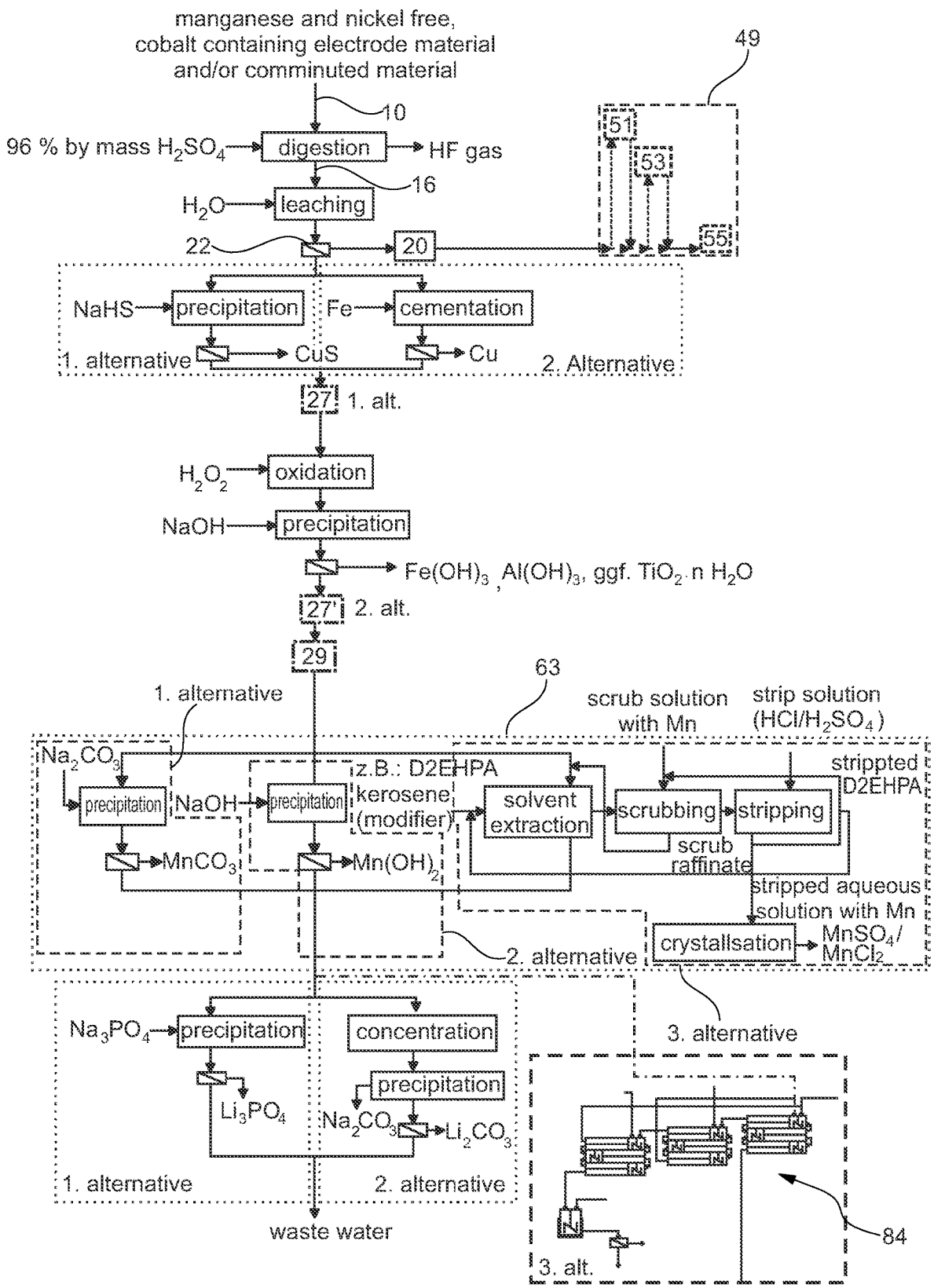

FIG. 4 shows a flow diagram for the processing of comminuted material and/or electrode material that is free of cobalt and nickel but contains manganese. For the extraction of manganese, only the variation with solvent extraction is depicted. The three alternatives shown in FIGS. 1 and 2 for the removal of the manganese are also possible for the method according to FIG. 4 and represent preferred embodiments. The three alternatives are precipitation as manganese carbonate, precipitation as manganese hydroxide and solvent extraction.

The alternatives to recovering the lithium are precipitation as lithium phosphate or as lithium carbonate.

The activated carbon filters 27, 27' are optional, as is the ion exchanger 29.

Figure 5:
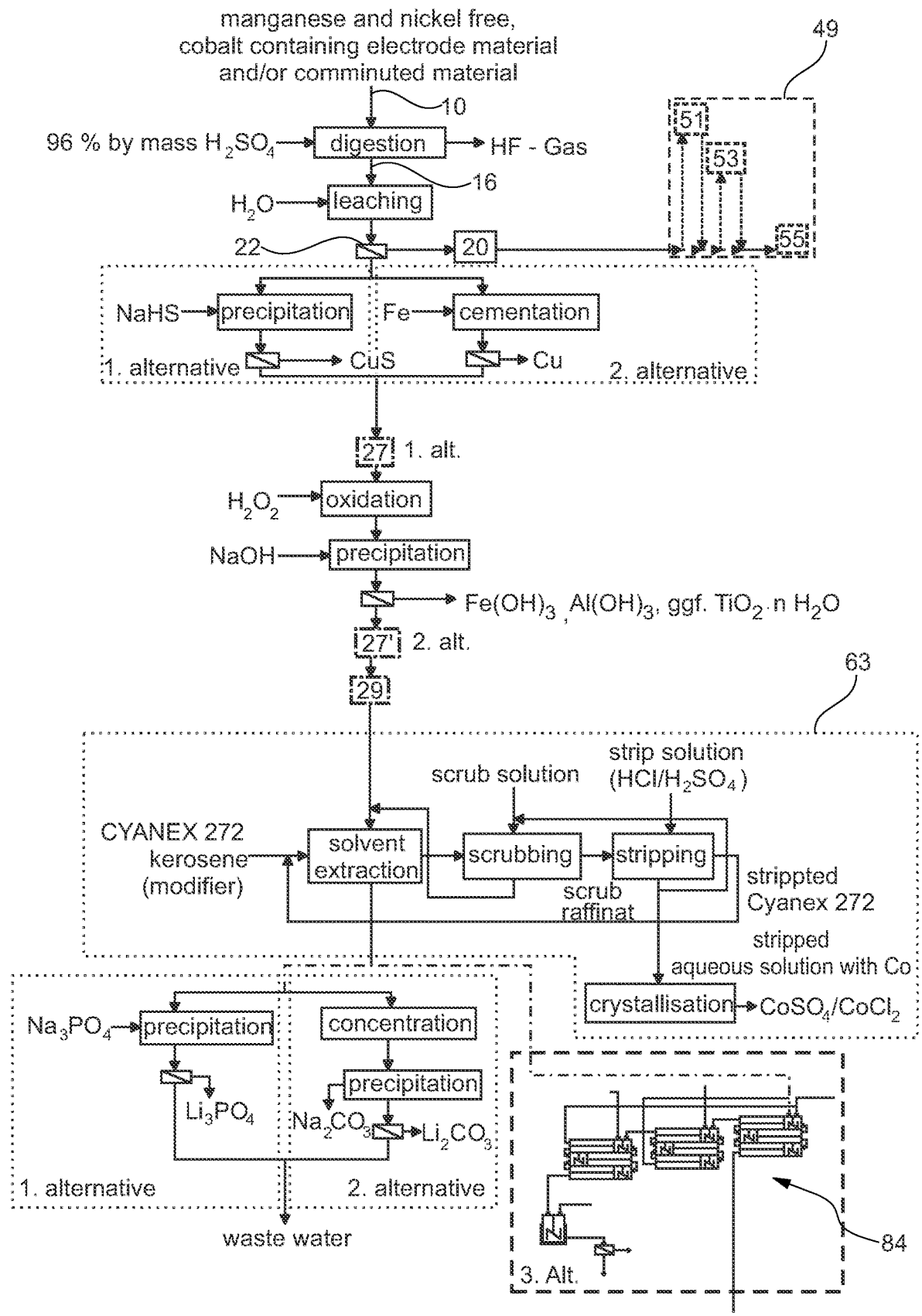

FIG. 5 depicts the flow diagram of a method for processing electrode and/or comminuted material that is free of manganese and nickel but contains cobalt. The alternatives to recovering the lithium are precipitation as lithium phosphate or as lithium carbonate. The activated carbon filters 27, 27' are optional, as is the ion exchanger 29.

Figure 6:
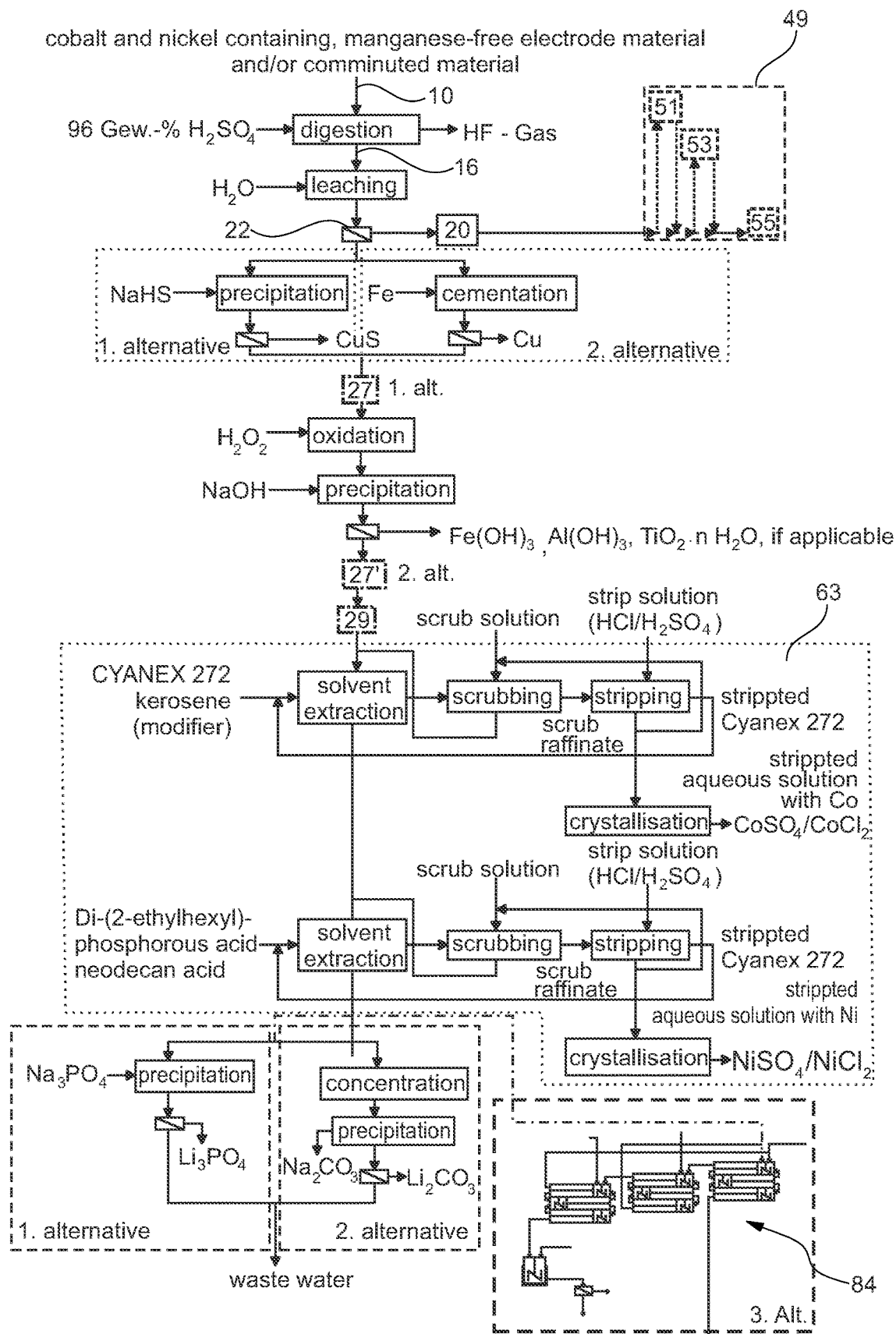

FIG. 6 shows a flow diagram of a method according to the invention for electrode and/or comminuted material that is free of manganese but contains cobalt and nickel. The alternatives to recovering the lithium are precipitation as lithium phosphate or as lithium carbonate. The activated carbon filters 27, 27' are optional, as is the ion exchanger 29.

Figure 7:
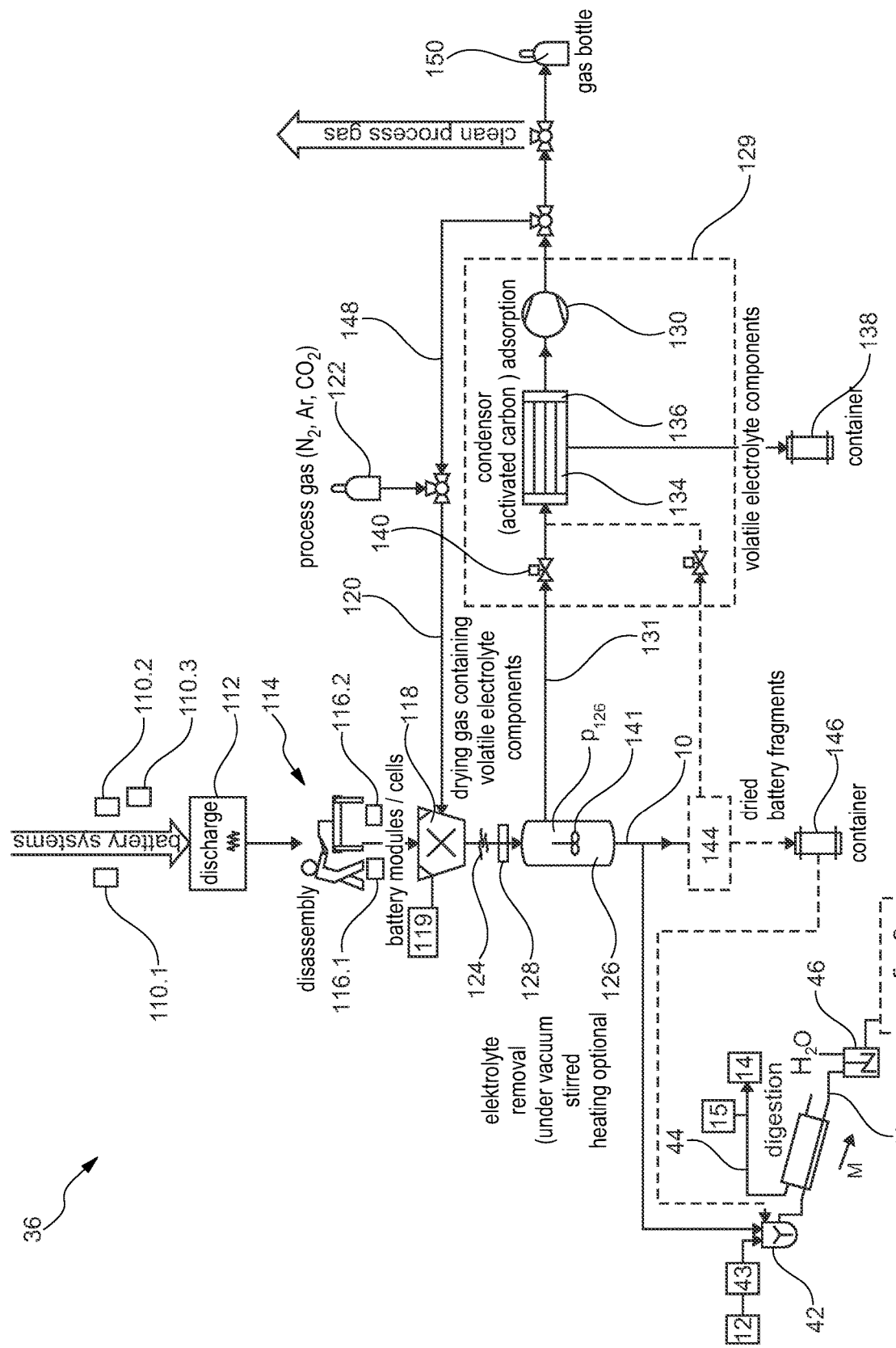

FIG. 7 depicts a second embodiment of a recycling installation 36 according to the invention, wherein the components arranged behind the leaching device 46 in the direction of material flow have been omitted for the sake of clarity.

It can be recognized that the recycling installation 36 comprises a comminution unit 118 and a deactivation device 126. The deactivation device 126 is designed as a drying device.

Lithium batteries 110.1, 110.2, . . . , in particular battery systems made up of several battery modules or battery stacks, which are in turn made up of several battery cells, are initially discharged in a discharge unit 112. This is followed by the dismantling of the lithium batteries 110 at a dismantling station 114, if this is necessary because the battery systems cannot otherwise be delivered into the comminution unit 118 for geometric or gravimetric reasons. To this end, where appropriate, the battery systems are opened and dismantled to the point at which the modules and/or stacks can be individually removed. If required, the individual lithium battery cells can also be separated from the drive electronics.

The resulting sub-units (modules/stacks) and/or cells 116.1, 116.2, ... are added to the comminution unit 118. For example, the comminution unit 118 may be a rotary shear with at least one rotor and at least one stator. The comminution unit 118 may also comprise a cutting mill with a rotor or several rotors.

The comminution unit 118 comminutes the lithium batteries 110.$i$ under shielding gas 120, which is extracted, for example, from a shielding gas cylinder 122. Alternatively or additionally, liquid nitrogen from a liquid nitrogen source 119 may be may be injected. The shielding gas may refer, for example, to nitrogen, a noble gas, carbon dioxide, nitrous oxide or another gas which is preferably not toxic.

Shredded material 124 is produced during comminution, which is fed into a deactivation device in the form of a drying device 126. An airlock 128 is arranged between the comminution unit 118 and the drying device 126, the airlock being so gas-tight that the drying device 126 is—to a good approximation—separated from the comminution unit 118 so as to be gas-tight.

The drying device 126 is connected to a vacuum installation 129 that comprises a vacuum pump 130 and creates a vacuum. A pressure $p_{126}$ from $p_{126} \approx 100 \pm 60$ hPa, preferably 50 hPa, is present in the drying device 126. It should be noted that, within the scope of the present description, the vacuum pump should be understood particularly generally to mean a device that creates a vacuum. It is possible and preferred, but not necessary, for the vacuum pump to simultaneously work as a compressor, such that gas is emitted from it under a pressure that is greater than the ambient pressure.

In the case depicted in FIG. 7, the vacuum pump is a compressor which suctions in and compresses gas 131 that is present in the drying device 126. Alternatively or additionally, the vacuum installation 129 may have a jet pump, wherein a jet medium in the form of a liquid is directed at a high speed through at least one Venturi nozzle. The jet medium is preferably alkaline and has a pH value of at least pH 1 and is, for example, a 10% potassium hydroxide solution.

The vacuum installation 129 comprises a gas purification device 132 that is arranged between the drying device 126 and the vacuum pump 130, and which has a condenser 134 and/or an activated carbon filter 136 in the present case. The condenser is operated at a temperature of, for instance, −10° C. so that dimethyl carbonate and ethyl methyl carbonate condense and can be dispensed into a condensate container 138. In addition, any water present is separated by freezing. A control valve 140 is designed to open if the pressure $p_{26}$ becomes too great and to close if the pressure $p_{126}$ becomes too small, i.e. when a pre-determined threshold value is not reached.

The drying material is preferably moved in the drying device 126. This may be achieved by agitating with an agitator 141, such as an anchor agitator or a rod agitator with, for example, rods arranged perpendicular to the agitator shaft. Alternatively, it can be achieved by way of a drying container that is moved.

The drying of the shredded material 124 results in deactivated comminuted material 10, which is added to the mixer 42.

Alternatively, a transport container 146 is then filled with the deactivated comminuted material 10 under a vacuum and/or shielding gas. The transport container 146 is preferably gas-tight. It is possible, but not necessary, for the transport container 146 to be filled with inert gas prior to transportation so that it is under normal pressure. Alternatively, it is also possible for the transport container to be sealed under vacuum and transported. It is possible that, instead of the transport container, a vacuum-sealed foil is selected, such as an aluminium compound foil.

The comminution unit 118 is fed with shielding gas 120 from the vacuum pump 130 via a flushing line 148. If the vacuum pump 130 also functions as a compressor—as in the present case—which represents a preferred embodiment, the shielding gas 120 can be drawn from a pressurized gas cylinder 150. Alternatively or additionally, the shielding gas 120 can be given off into the surroundings, following additional purification if necessary.

Figure 8A:
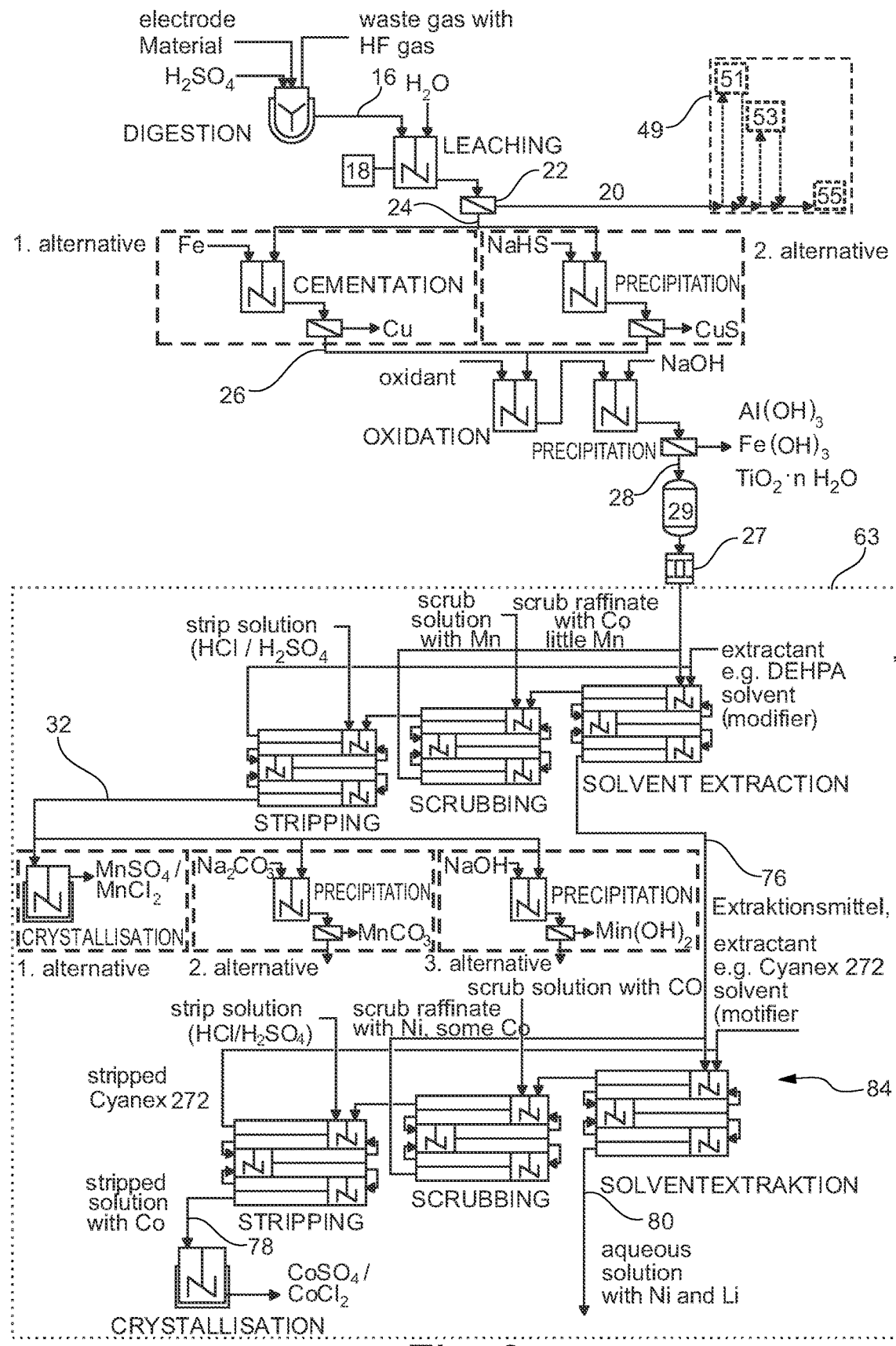
FIGS. 8a and 8b show a flow diagram for a method according to the invention.

FIG. 8a depicts multiple variations of a further method according to the invention. FIG. 8a shows that by extracting cobalt, nickel and silicon from the pure fluid 28, a target fluid containing manganese 32 is obtained.

According to a first alternative, manganese sulphate or manganese chloride are obtained from the target fluid containing manganese 32 through crystallization.

According to a second alternative, manganese carbonate is obtained through precipitation with a carbonate, such as sodium carbonate.

As a third alternative, manganese hydroxide is precipitated by adding sodium hydroxide, for example. A manganese-free target fluid 76 is produced from the target fluid containing manganese 32, from which cobalt is removed, for example using Cyanex 272. This results in a fluid containing cobalt 78, from which cobalt is crystallized in the form of cobalt sulphate or cobalt chloride. In addition to the fluid containing cobalt 78, a cobalt-free fluid 80 is produced, which contains nickel and lithium.

Figure 8B:
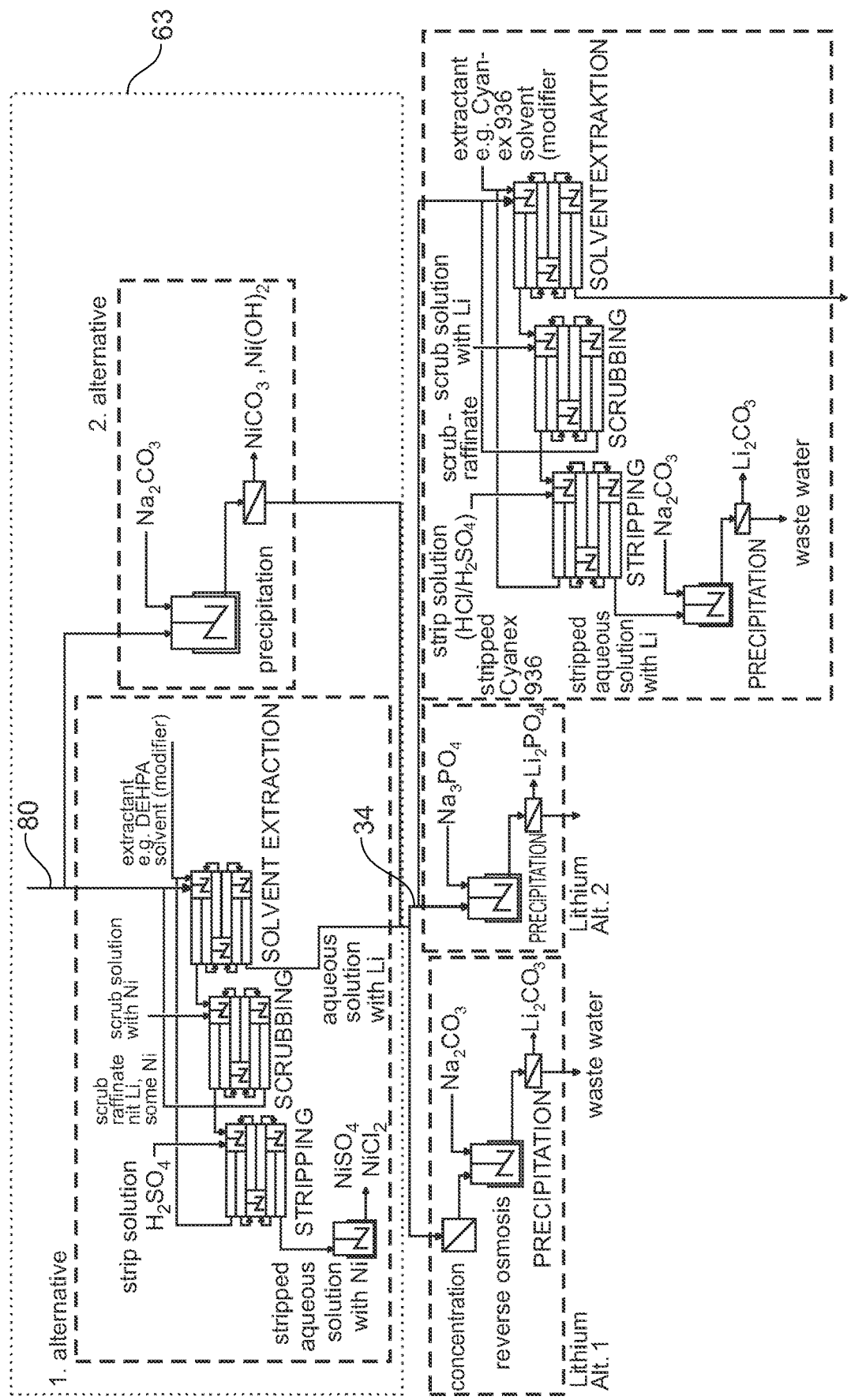

FIG. 8b shows the further processing of the cobalt-free fluid 80. First, nickel is extracted either according to a first alternative by solvent extraction and from the resulting fluid containing nickel 82 the nickel is crystallized as nickel sulphate or nickel chloride. Alternatively, nickel is precipitated, for example by adding sodium carbonate. From the resulting target fluid 34, lithium is precipitated as lithium carbonate according to a first alternative, as lithium phosphate according to a second alternative or, according to a third alternative, extracted by means of Cyanex 936, for example, and then precipitated as lithium carbonate.

Figure 9:
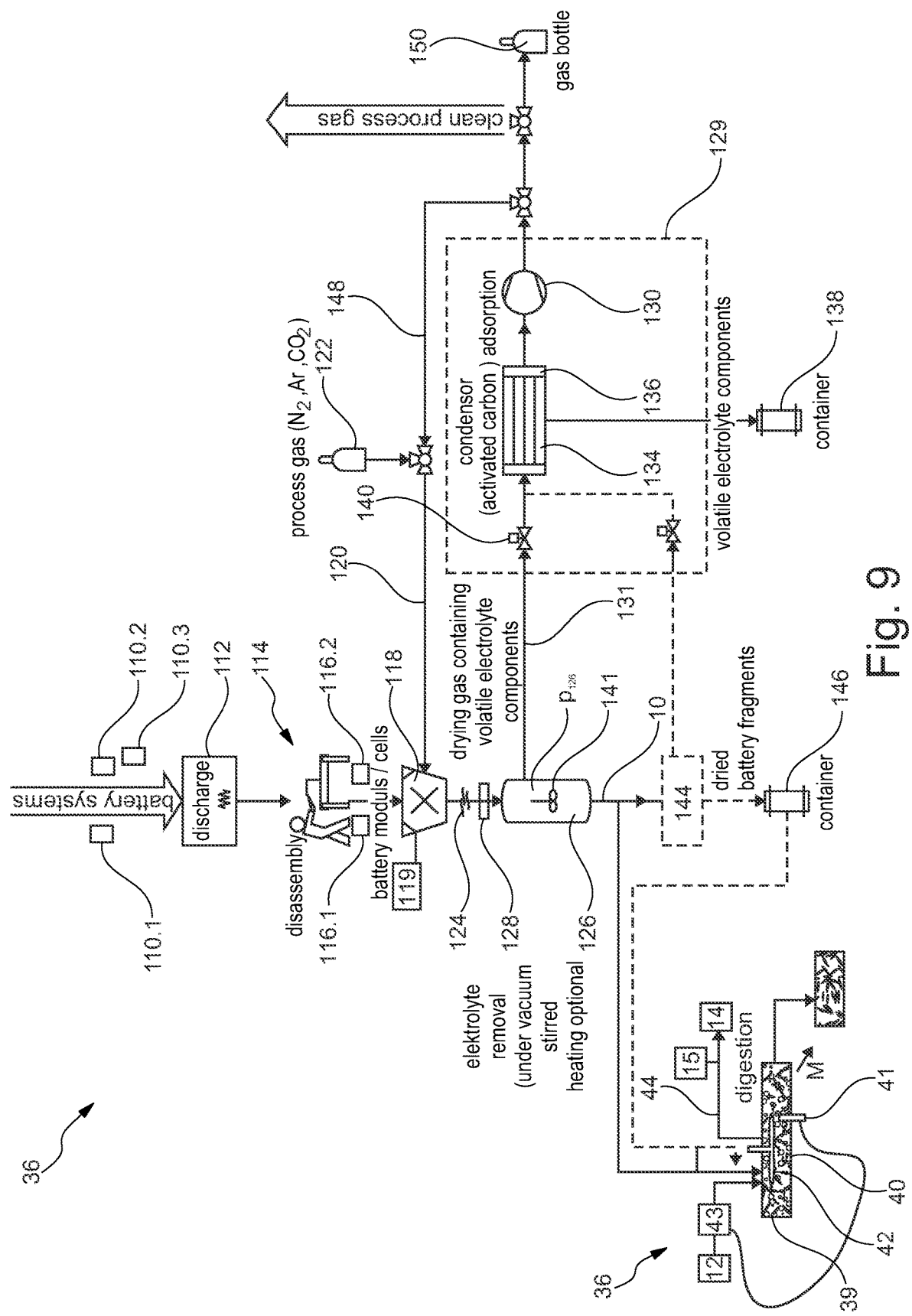
FIG. 9 shows a recycling installation according to the invention according to a further embodiment and FIG. 10 schematically depicts a graphite purification installation of a recycling installation according to the invention.

FIG. 9 shows a recycling installation according to the invention according to a further embodiment.

Figure 10:
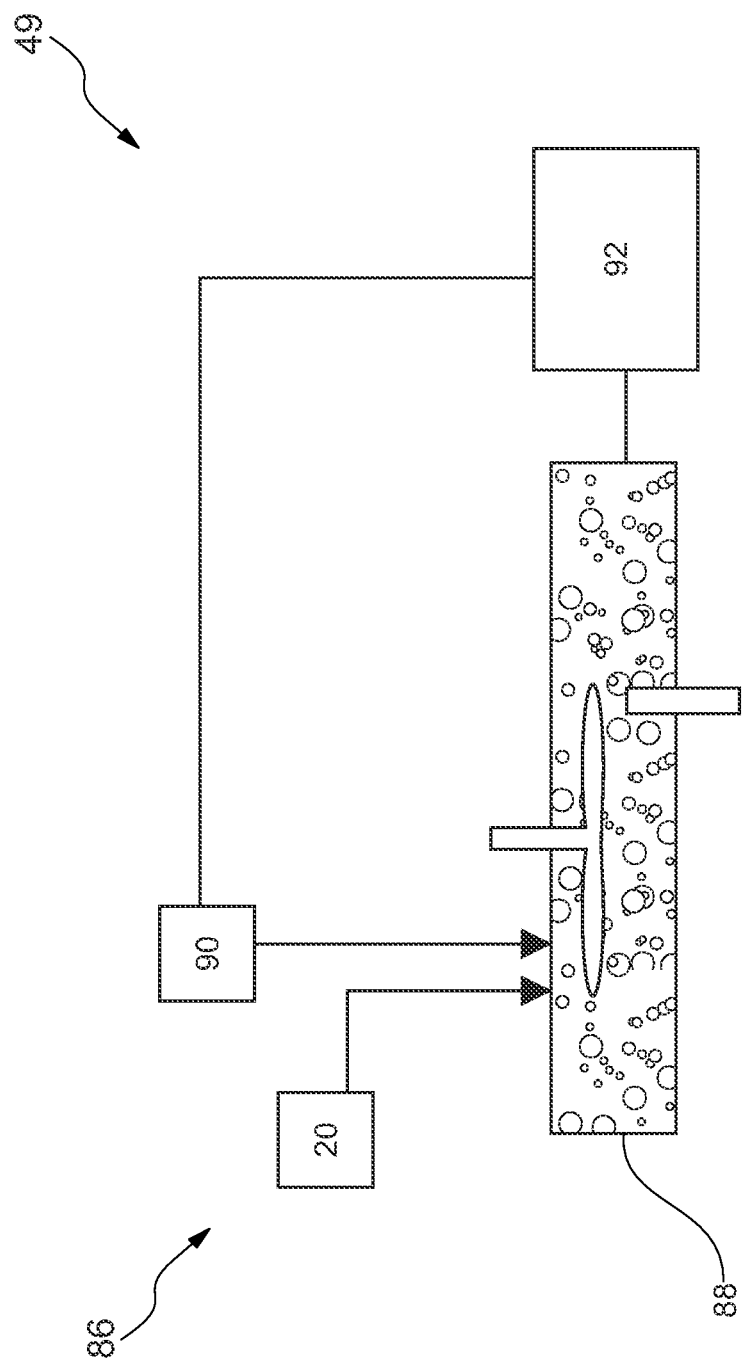

FIG. 10 schematically depicts an embodiment of the graphite purification installation 49, which has a washer 86. The washer 86 features a container 88 in which the graphite 20 is mixed with a solvent 90. A temperature of the solvent 90, in the present case water with 10% by weight N-Methylpyrrolidone, is heated to $T_{90}=60°$ C. The mixture of solvent 90 and graphite 20 is mixed using a mixer. Solvent is withdrawn from the container 88 by means of a separator 92, the temperature is lowered so that the solubility of binder residues in the solvent is reduced, and the precipitated binder residues are separated, for example filtered off. The solvent 90 is then returned to the container 88.

| Reference list | |
|---|---|
| 10 | comminuted material |
| 11 | container |
| 12 | sulphuric acid |
| 14 | waste gas |
| 15 | fluoride detector |
| 16 | digestion material |
| 18 | water |
| 20 | graphite |
| 22 | graphite separation device |
| 24 | raw fluid |
| 26 | de-copperized raw fluid |
| 27 | activated charcoal filter |
| 28 | pure fluid |
| 29 | ion exchanger |
| 30 | solution |
| 32 | target fluid containing manganese |
| 34 | target fluid |
| 36 | recycling installation |
| 37 | conveyor |
| 38 | electrode material |
| 39 | mixture |
| 40 | reactor |
| 41 | mixture temperature detection device |
| 42 | mixer |
| 43 | sulphuric acid supply device |
| 44 | discharge device |
| 45 | sulphuric acid container |
| 46 | leaching device |
| 47 | controllable valve |
| 48 | graphite recovery device |
| 49 | graphite purification installation |
| 50 | copper extractor |
| 51 | leaching reactor |
| 52 | container |
| 53 | furnace |
| 54 | precipitation material separator |
| 55 | classifier |
| 56 | Fe/Al/Ti precipitation material separator |
| 57 | gas supply |
| 58 | oxidation agent |
| 60 | container |
| 62 | particle separator |
| 63 | transition metal extraction device |
| 64 | solvent extraction device |
| 66 | Co/Ni solvent extraction device |
| 68 | reaction container |
| 70 | Mn solvent extraction device |
| 72 | precipitation reactor |
| 74 | concentrator |
| 76 | manganese-free target fluid |
| 78 | target fluid containing cobalt |
| 80 | cobalt-free target fluid |
| 82 | target fluid containing nickel |
| 84 | lithium solvent extraction installation |
| 86 | washer |
| 88 | container |
| 90 | solvent |
| 92 | separator |
| 110 | lithium battery |
| 114 | dismantling station |
| 116 | cells |
| 118 | comminution unit |
| 119 | liquid nitrogen source |
| 120 | shielding gas |
| 124 | shredded material |
| 126 | drying device |
| 128 | airlock |
| 129 | vacuum installation |
| 130 | vacuum pump |
| 131 | gas |
| 132 | gas purification device |
| 134 | condenser |
| 136 | activated charcoal filter |
| 138 | condensate container |
| 140 | control valve |
| 141 | agitator |
| 146 | transport container |
| 148 | flushing line |
| 150 | pressurized gas cylinder |

| Reference list | |
|---|---|
| $c_F$ | fluoride concentration |
| M | direction of material flow |
| $q_m$ | dosage mass flow |
| $T_A$ | digestion temperature |
| $T_Z$ | decomposition temperature |

The invention claimed is:

1. A method for recycling lithium batteries, comprising:
digesting a comminuted material containing comminuted components of electrodes of lithium batteries using concentrated sulphuric acid,
wherein the comminuted material is not pyrometallurgically treated prior to digesting with concentrated sulphuric acid,
wherein digesting is performed such that a waste gas and a digestion material are produced,
discharging the waste gas, and
performing wet chemical extraction of at least one metallic component of the digestion material,
wherein the comminuted material contains fluoride components and wherein the digestion is conducted such that fluoride components in the comminuted material pass into the waste gas as gaseous fluorine compounds.

2. The method according to claim 1, wherein the digestion of the comminuted material comprises:
(a) mixing the concentrated sulphuric acid and the comminuted material to produce a mixture,
(b) detecting a mixture temperature ($T_M$) of the mixture, and
(c) controlling or regulating
(i) a dosage mass flow ($q_m$) of the concentrated sulphuric acid, and/or
(ii) an addition mass flow ($q_{10}$) of the comminuted material,
so that the mixture temperature ($T_M$) remains within a predetermined mixture temperature range (I).

3. The method according to claim 1, wherein the digestion of the comminuted material comprises:
(a) dosing the concentrated sulphuric acid to the comminuted material with a dosage mass flow ($q_m$) so that a mixture is created,
(b) detecting a mixture temperature ($T_M$) of the mixture, and
(c) regulating the dosage mass flow ($q_m$) so that the mixture temperature ($T_M$) remains within a predetermined mixture temperature range (I).

4. A method for recycling lithium batteries containing:
digesting comminuted material, which contains comminuted components of electrodes of lithium batteries, using concentrated sulphuric acid, so that waste gas and a digestion material are produced,
wherein the comminuted material is not calcinated or combusted prior to digesting with concentrated sulphuric acid,
discharging the waste gas and
performing wet chemical extraction of at least one metallic component of the digestion material,
wherein the comminuted material contains fluoride components and wherein the digestion is conducted until a concentration of water-soluble fluoride in the digestion material is lower than 100 mg/kg.

5. The method according to claim 4 further comprising conducting an ion exchange prior to performing the wet chemical extraction of the at least one metallic component wherein cobalt and/or nickel and/or manganese and/or lithium are not removed during the ion exchange.

6. The method according to claim 4 further comprising absorbing organic components prior to performing the wet chemical extraction of the at least one metallic component.

7. The method according to claim 1 further comprising:
(a) separating graphite from the digestion material thereby producing a raw fluid, and
(b) purifying the graphite so that a content of non-metallic impurities is reduced compared to another content of non-metallic impurities if no purifying were performed.

8. The method according to claim 7, wherein purifying the graphite comprises a heating to a decomposition temperature ($T_Z$) of a binder of 250° C. to 700° C.

9. The method according to claim 7 further comprising:
(a) classifying the graphite so that a first fraction with a first binder content and a second fraction with a second binder content that is at least twice as large as the first binder content are obtained,
(b) floating the graphite or the binder in an aqueous flotation fluid.

10. The method according to claim 7 wherein purifying the graphite comprises dissolving a binder out of the graphite using a solvent.

11. The method according to claim 7 wherein
(a) purifying the graphite comprises a rinsing and/or washing with acid, and
(b) purifying the graphite is carried out until a concentration of metallic impurities is at most 10 000 ppm.

12. The method according to claim 7 wherein purifying the graphite comprises
(a) a leaching and/or washing with an oxidation agent, and
(b) purifying the graphite is carried out until a concentration of metallic impurities is at most 10 000 ppm.

13. The method according to claim 1 further comprising separating graphite from the digestion material thereby producing a raw fluid;
(a) separating copper from the raw fluid so that a de-copperized raw fluid is obtained; and
(b) conducting an ion exchange after the copper has been separated.

14. The method according to claim 1 further comprising:
(a) removing of cobalt from the digestion material by a cobalt complexing agent, and/or
(b) removing nickel from the digestion material with a nickel complexing agent, and/or
(c) removing manganese from the digestion material with a manganese complexing agent, so that a target fluid is obtained.

15. The method according to claim 1 wherein during wet chemical extraction
(a) manganese is extracted before cobalt, and/or
(b) cobalt is extracted before nickel.

16. The method according to claim 1 wherein the digesting is conducted until a concentration of water-soluble fluoride in the digestion material is lower than 100 mg/kg.

17. The method according to claim 1 further comprising separating hydrogen fluoride from the waste gas.

18. The method according to claim 1 wherein the comminuted material contains graphite and wherein the method further comprises:
leaching of the digestion material, and separating graphite from the digestion material thereby producing a raw fluid.

19. The method according to claim 18, wherein the comminuted material contains copper and wherein the method further comprises
separating copper from the raw fluid so that a de-copperised raw fluid is obtained.

20. The method according to claim 4 further comprising:
(a) leaching the digestion material, and
(b) conducting an ion exchange of the digestion material during which removes metallic impurities, wherein the ion exchange is performed prior to the wet chemical extraction of the at least one metallic component.

21. The method according to claim 20, wherein the communited material contains fluoride components and wherein the digestion is conducted in such a way that fluoride components in the comminuted material pass into the waste gas in the form of gaseous fluorine compounds.

* * * * *